(12) United States Patent
Zhu

(10) Patent No.: US 7,720,301 B2
(45) Date of Patent: May 18, 2010

(54) STRUCTURE CHARACTERIZATION OF IMAGES

(75) Inventor: Ge Zhu, Shanghai (CN)

(73) Assignee: Huaya Microelectronics, Ltd., San Jose, CA (US)

( * ) Notice: Subject to any disclaimer, the term of this patent is extended or adjusted under 35 U.S.C. 154(b) by 613 days.

(21) Appl. No.: 10/839,742

(22) Filed: May 4, 2004

(65) Prior Publication Data
US 2005/0180652 A1 Aug. 18, 2005

(30) Foreign Application Priority Data
Feb. 18, 2004 (CN) .......................... 2004 1 0016393

(51) Int. Cl.
*G06K 9/40* (2006.01)

(52) U.S. Cl. ...................... 382/254; 382/162; 348/448; 348/452; 348/607

(58) Field of Classification Search ................. 382/162, 382/254; 348/448, 452, 607
See application file for complete search history.

(56) References Cited

U.S. PATENT DOCUMENTS 6,608,942 B1 * 8/2003 Le ............................ 382/279
2005/0008212 A1 * 1/2005 Ewing et al. ................. 382/133

* cited by examiner

*Primary Examiner*—Vikkram Bali
*Assistant Examiner*—Eueng-Nan Yeh
(74) *Attorney, Agent, or Firm*—Silicon Valley Patent Group, L.L.P.; Edward S. Mao

(57) ABSTRACT

A method and system for characterizing structures in an image are presented. The method and system generates a structure checksum value based on a plurality of pixels in the image. The structure checksum is used as an index of a look-up table containing structure characteristics corresponding to the structure checksum values.

21 Claims, 21 Drawing Sheets

| P(i-1,j+4) | P(i,j+4) | P(i+1,j+4) |
| --- | --- | --- |
| P(i-1,j+3) | P(i,j+3) | P(i+1,j+3) |
| P(i-1,j+2) | P(i,j+2) | P(i+1,j+2) |
| P(i-1,j+1) | P(i,j+1) | P(i+1,j+1) |
| P(i-1,j) | P(i,j) | P(i+1,j) |
| P(i-1,j-1) | P(i,j-1) | P(i+1,j-1) |
| P(i-1,j-2) | P(i,j-2) | P(i+1,j-2) |
| P(i-1,j-3) | P(i,j-3) | P(i+1,j-3) |
| P(i-1,j-4) | P(i,j-4) | P(i+1,j-4) |

STRUCTURE CHARACTERIZATION OF IMAGES

BACKGROUND OF THE INVENTION

1. Field of the Invention

The present invention relates to digital image and video processing. More specifically, the present invention relates to methods of improving image quality of video streams.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field.

Interlaced video systems were designed when bandwidth limitations precluded progressive (i.e., non-interlaced) video systems with adequate frame rates. Specifically, interlacing two 30 fps fields achieved an effective 60 frame per second frame rate because the phosphors used in television sets would remain "lit" while the second field is drawn. Progressive video streams use complete frames, including both the even and odd scan lines instead of fields. Because progressive scan provides better display quality, computer systems, which were developed much later than the original television systems, use progressive scan display systems. Furthermore, many modern televisions and television equipment are being developed to use progressive video streams. To maintain compatibility with existing interlaced video systems, modern progressive systems use deinterlacing techniques to convert interlaced video streams into progressive video streams.

FIGS. 2(a) and 2(b) illustrate a typical method of generating a progressive video stream 200 from an interlaced video stream 100. Specifically each field 100_X of interlaced video stream 100 is converted to a frame 200_X of progressive video stream 200. The conversion of a field to a frame is accomplished by generating the missing scan lines in each frame by copying or interpolating from the scan lines in the field. For example, as illustrated in FIG. 2(b) field 100_1 having odd scan lines 100_1_1, 100_1_3, 100_1_5, . . . 100_1_N, is converted into a frame 200_1 by copying scan lines 100_1_X as odd scan lines 200_1_X, where X is an odd number and creating even scan lines 200_1_Y, where Y is an even number. Even scan lines 200_1_Y can be created by copying the preceding odd scan line 200_1_Y−1. This technique is commonly known as line repeat. Better results can be obtained using various interpolation schemes to generate the missing scan lines. For example, one interpolation scheme simply averages odd scan line 200_1_Y−1 with odd scan line 200_1_Y+1 to generate even scan line 200_1_Y. Other interpolation schemes may use weighted averages or other more complicated ways to combine data from the existing scan lines to generate the missing scan lines. De-interlacing techniques that use data from one field to convert the field into a frame are often called intrafield de-interlacing or 2D deinteralcing. A well known problem with intrafield deinterlacing is that diagonal lines in the deinterlaced frames appear jagged.

To minimize jaggedness, most deinterlacers incorporate another deinterlacing technique known as interfield deinterlacing or 3D deinterlacing. Interfield deinterlacing involves generating the missing scan lines by interpolating the missing pixels using data from adjacent fields. While interfield deinterlacing reduces jaggedness of non-moving diagonal lines, moving diagonal lines (for example a diagonal line on a moving object) still have a jagged appearance.

Hence, there is a need for a method or system that can be used with deinterlaced frames to correct jaggedness of diagonal lines of moving objects.

SUMMARY

Accordingly, the present invention provides a method and system for enhancing a frame to reduce the jaggedness of diagonal lines of moving objects in a video stream. In one embodiment of the present invention, an image enhancer determines whether a current pixel is a still pixel. If the current pixel is not a still pixel the current pixel is enhanced to reduce jaggedness. Specifically, a pixel consolidation unit consolidates pixels to form a smoothing filter of consolidated pixels. The smoothed pixel is calculated based on consolidated pixels from the smoothing filter.

In particular, the smoothing filter is analyzed and a selected edge direction of a selected edge is chosen. In some embodiments of the present invention the selected edge is the dominant edge in the smoothing filter. In other embodiments both the dominant edge and a secondary edge are analyzed to determine which should be selected as the selected edge. A first edge end pixel and a second edge end pixel are calculated from the selected edge. In one embodiment of the present invention the smoothed pixel is equal to a normalized linear combination of the first edge end pixel, the second edge end pixel and the center entry of the smoothing filter.

Some embodiments of the present invention also includes a structure characterization unit which analyzes the pixels around the current pixel and provides a structure characteristic, which can be used to determine whether using the smoothed pixel would obscure subtle structures in the image. The structure characterization unit includes a pixel comparison unit that generates structure checksum bit groups that are combined to form a structure checksum. The structure checksum is used to index a lookup table containing structure characteristics for each corresponding checksum value. For the image smoother, the structure characteristic indicates the presence of subtle structure.

The present invention will be more fully understood in view of the following description and drawings.

BRIEF DESCRIPTION OF THE DRAWINGS

FIG. 4 illustrates the nomenclature used to describe the pixels of a video buffer in accordance to one embodiment of the present invention.

DETAILED DESCRIPTION

Figure 1:
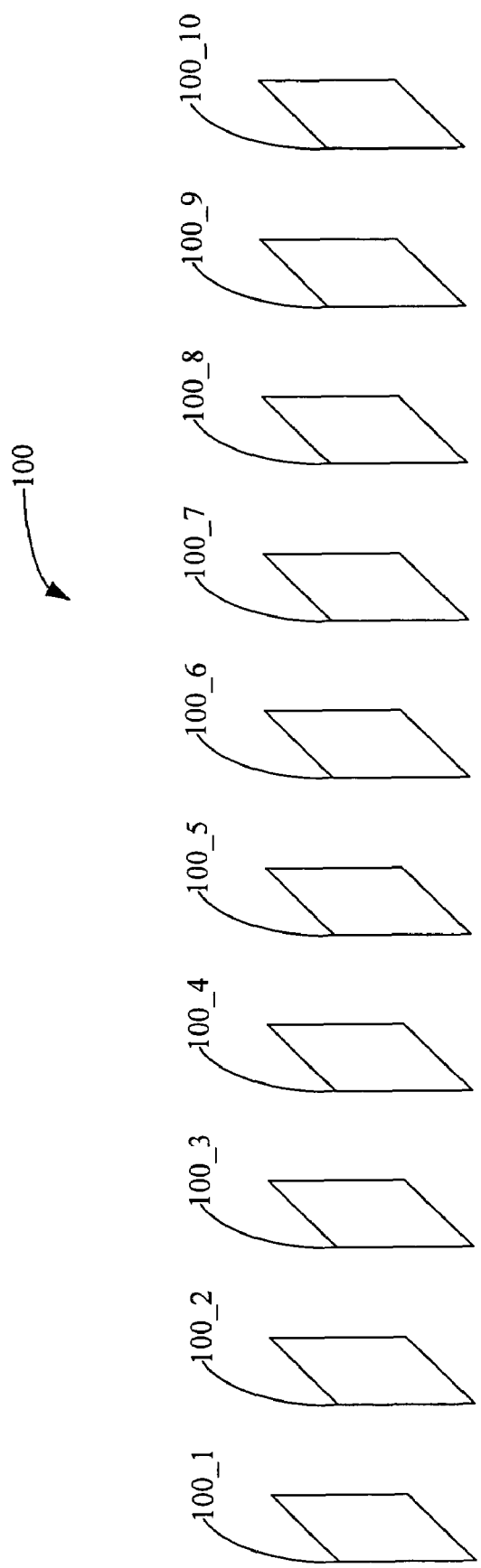
FIG. 1 is an illustration of an interlaced video stream.
Figure 2A:
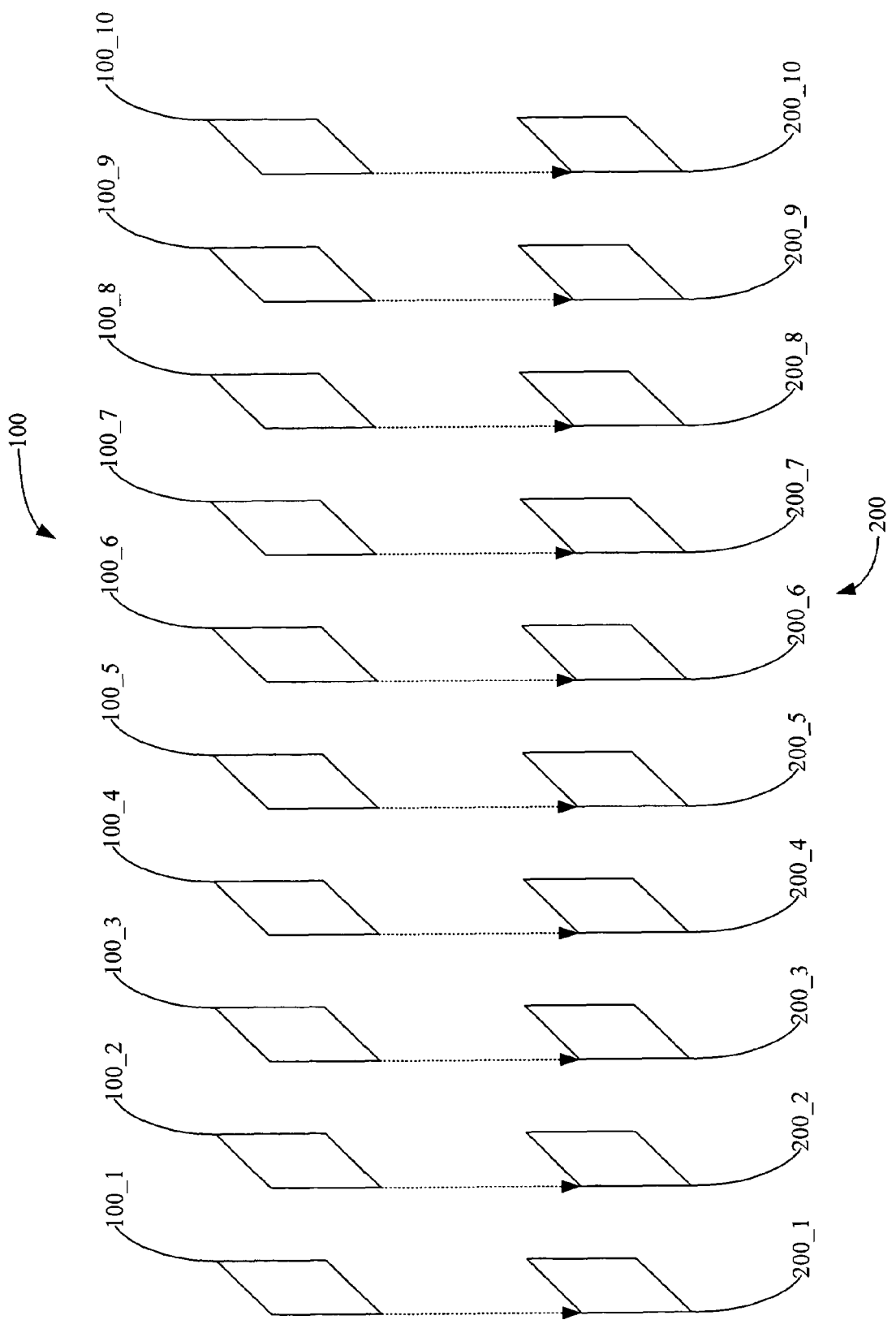
FIGS. 2(a) and 2(b) illustrate a deinterlacing process to form a de-interlaced video stream.
Figure 2B:
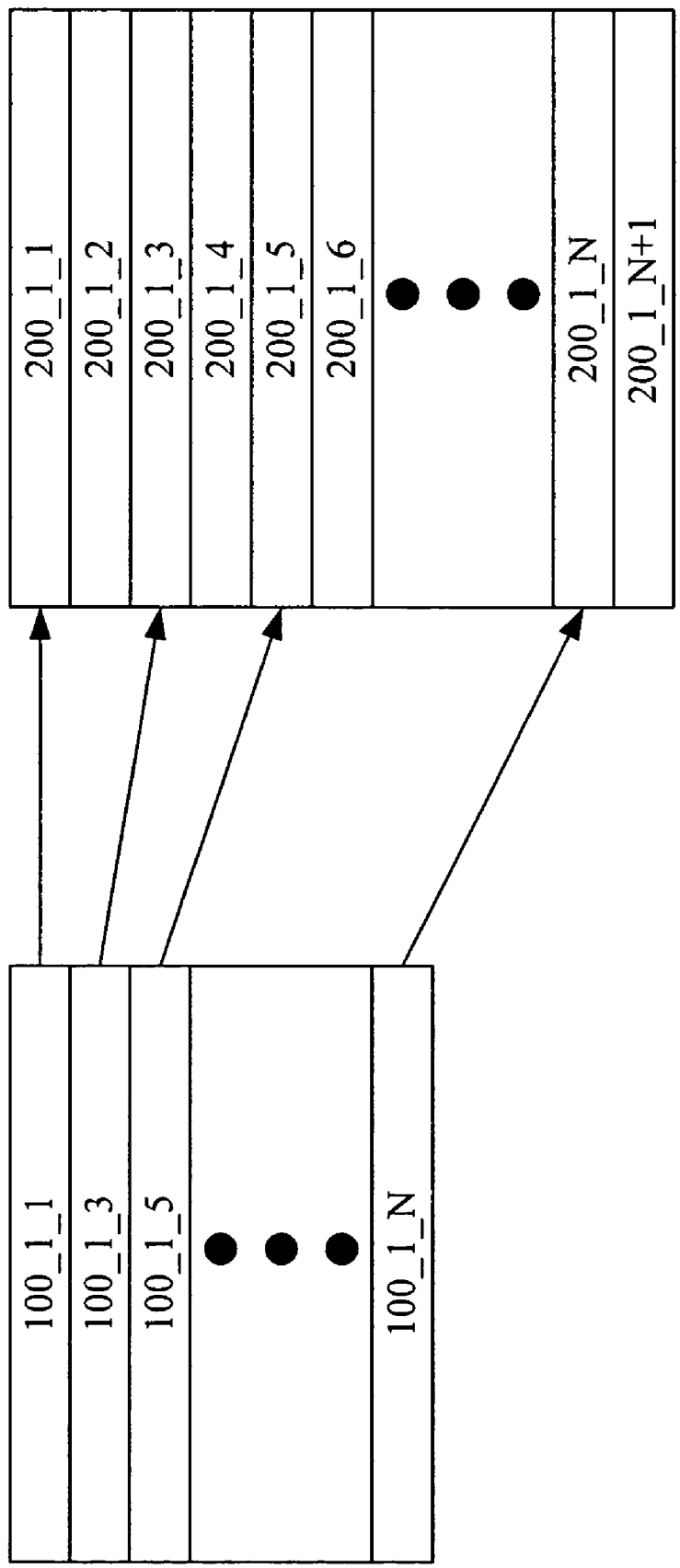
Figure 3:
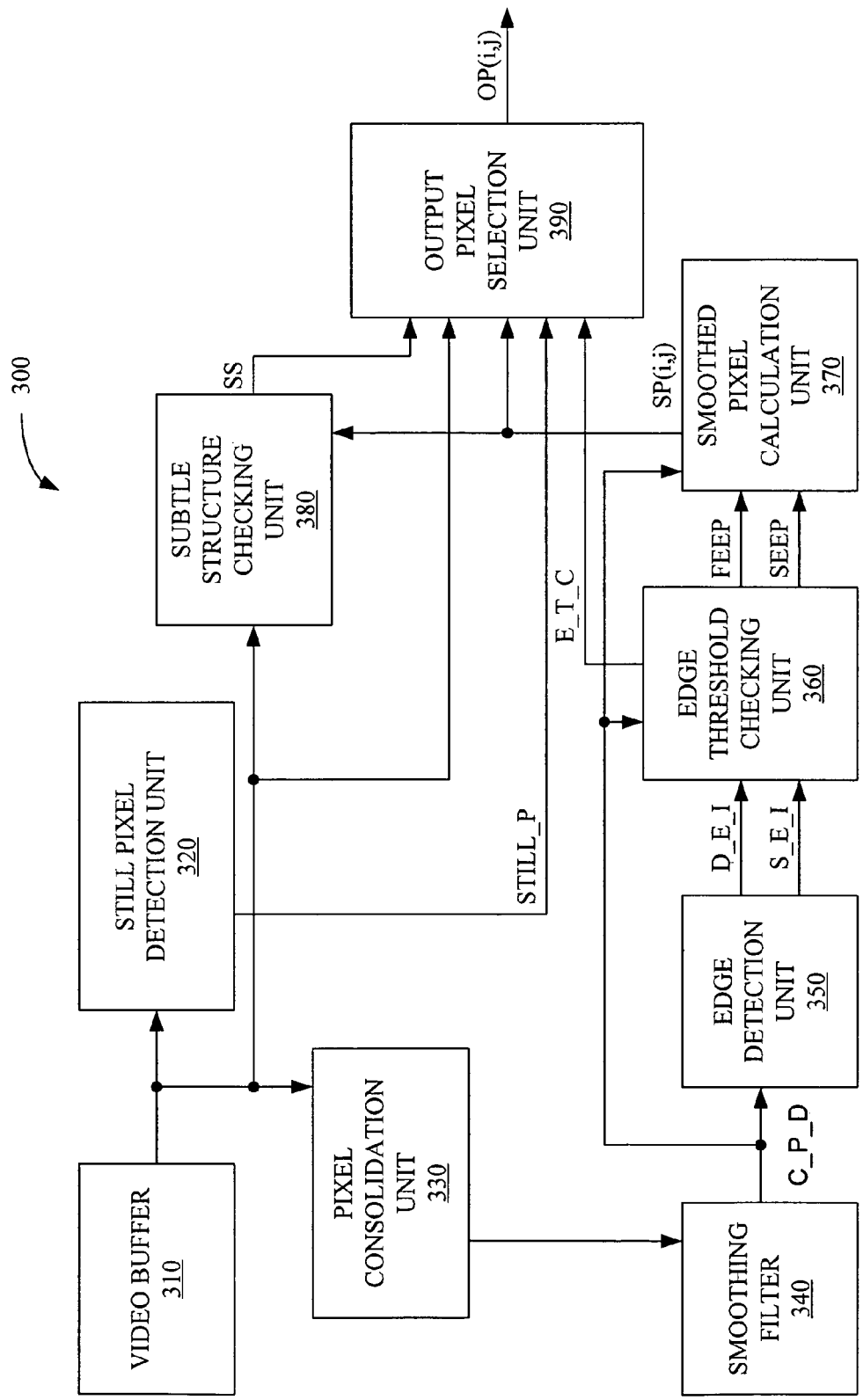
FIG. 3 is a block diagram of an image smoother in accordance with one embodiment of the present invention.

As explained above, deinterlaced frames typically have jagged edges on diagonal lines of moving objects. To reduce the jagged appearance the present invention performs directional smoothing. FIG. 3 is a block diagram of an image smoother 300 in accordance with one embodiment of the present invention. Image smoother 300 includes a video buffer 310, a still pixel detection unit 320, a pixel consolidation unit 330, a smoothing filter 340, an edge detection unit 350, an edge threshold checking unit 360, a smoothed pixel calculation unit 370, a subtle structure checking unit 380, and an output pixel selection unit 390.

Image smoothing is performed on a pixel by pixel basis on a current pixel P(i,j) from a current frame that is being processed. Because image smoothing only requires luminance data, when pixels are used herein for calculation, luminance value of the pixel is implied. Thus for example, in an equation such as EXAMPLE=2*P(x,y), EXAMPLE is equal to two times the luminance of pixel P(x,y). In general pixel data from the current frame are stored in video buffer 310 in YUV format. Thus, luminance values are easily obtained. However some embodiments of the present invention may use RGB or some other format in which the luminance value must be calculated from the pixel data. Pixel data from video buffer 310 is provided to still pixel detection unit 320, pixel consolidation unit 330, subtle structure checking unit 380, and output pixel selection unit 390. Still pixel detection unit 320 determines whether the current pixel P(i,j) is a still pixel and generates a still pixel signal STILL_P to output pixel selection unit 390. Pixel consolidation unit 330 calculates consolidated pixels to create smoothing filter 340 as described below. Consolidated pixel data C_P_D from smoothing filter 340 is provided to edge detection unit 350, edge threshold checking unit 360, and smoothed pixel calculation unit 370. Edge detection unit 350 analyzes consolidated pixel data C_P_D from smoothing filter 340 to determine a dominant edge and a secondary edge in smoothing filter 340. Dominant edge information D_E_I and secondary edge information S_E_I is provided to edge threshold checking unit 360, which determines whether the detected dominant edge and secondary edge are strong enough to be used for smoothing. Edge threshold checking unit 360 (which is described in detail below) provides an edge threshold control signal E_T_C to output pixel selection unit 390 and a first edge end pixel FEEP and a second edge end pixel SEEP to smoothed pixel calculation unit 370. Smoothed pixel calculation unit 370, which calculates smoothed pixel SP(i,j) using consolidated pixel data C_P_D from smoothing filter 340, first edge end pixel FEEP from edge threshold checking unit 360, and second edge end pixel SEEP from edge threshold checking unit 360. In some embodiments of the present invention, secondary edge information S_E_I is neither calculated nor used. Smoothed pixel SP(i,j) is used in place of current pixel P(i,j) if certain conditions (as described below) are met (or certain conditions are unmet). Subtle structure checking unit 380 determines whether the area around current pixel P(i,j) contains subtle structures that should not be smoothed. Subtle structure checking unit produces a subtle structure signal SS for output selection unit 390. Output selection unit 390 selects either current pixel P(i,j) or smoothed pixel SP(i,j) as the current output pixel OP(i,j) depending on the state of still pixel signal STILL_P, subtle structure signal SS, and edge threshold control signal E_T_C.

Video buffer 310 is typically a plurality of line buffers. The minimum number of line buffers in video buffer 310 depends on the size of smoothing filter 340. For clarity the examples presented herein use a 3×3 smoothing filter. However, one skilled in the art can easily adapt the teachings presented herein to use smoothing filters of different sizes. For a 3×3 smoothing filter, video buffer 310 includes three line buffers. The line buffers are used circularly so that at any moment video buffer 310 includes a current line, a previous line, and a next line. FIG. 4 illustrates a portion of video buffer 310 around current pixel P(i,j). For clarity the pixels near current pixel P(i,j) are referenced using a coordinate system centered on current pixel P(i,j). The first coordinate indicates the vertical position and the second coordinate indicates the horizontal position. Thus, the pixel above current pixel P(i,j) is pixel P(i−1,j). Conversely, the pixel below current pixel P(i,j) is pixel P(i+1,j). The pixel just to the left of current pixel P(i,j) is pixel P(i,j−1). The pixel just to the right of current pixel P(i,j) is pixel P(i,j+1).

As explained above, moving objects with diagonal lines cause excessive jaggedness. Therefore, most embodiments of the present invention only smooth non-still (i.e. moving pixels). Thus, image smoother 300 includes still pixel detection unit 320 to determine whether current pixel P(i,j) is a still pixel. However, other embodiments of the present invention may omit still pixel detection unit 320 and smooth every pixel. Because still pixel detection is not an integral part of the present invention, almost any still pixel detection techniques can be used with the present invention. For example, the still pixel detection unit disclosed in U.S. patent application Ser. No. 10/659,038-3279, filed Sep. 9, 2003, entitled "Still Pixel Detection Using Multiple Windows and Thresholds" by Zhu et al., which is incorporated herein by reference; can be used for still pixel detection unit 320. Still pixel detection is also described in China Patent Application# 03128819.7, filed May 23, 2003. Still pixel detection unit 320 provides a still pixel signal STILL_P, which indicates whether current pixel P(i,j) is a still pixel, to output pixel selection unit 390. In image smoother 300, when current pixel P(i,j)is a still pixel, still pixel signal STILL_P is driven to logic high. Conversely when current pixel P(i,j) is a moving pixel (i.e., non-still pixel) still pixel signal STILL_P is driven to logic low.

Pixel consolidation unit 330 calculates consolidated pixels to create smoothing filter 340. A consolidated pixel is calculated by normalizing a consolidation size CS number of consecutive pixels in the same line. In generating a consolidated pixel, the width of each pixel is assumed to be one. The consolidation size CS can be any positive real number (i.e., consolidation size CS does not need to be an integer). Therefore, the calculation of a consolidated pixel may make use of partial pixels. For clarity, the set of pixels used to calculate a consolidated pixel is referred to as a consolidation range.

Figure 6:
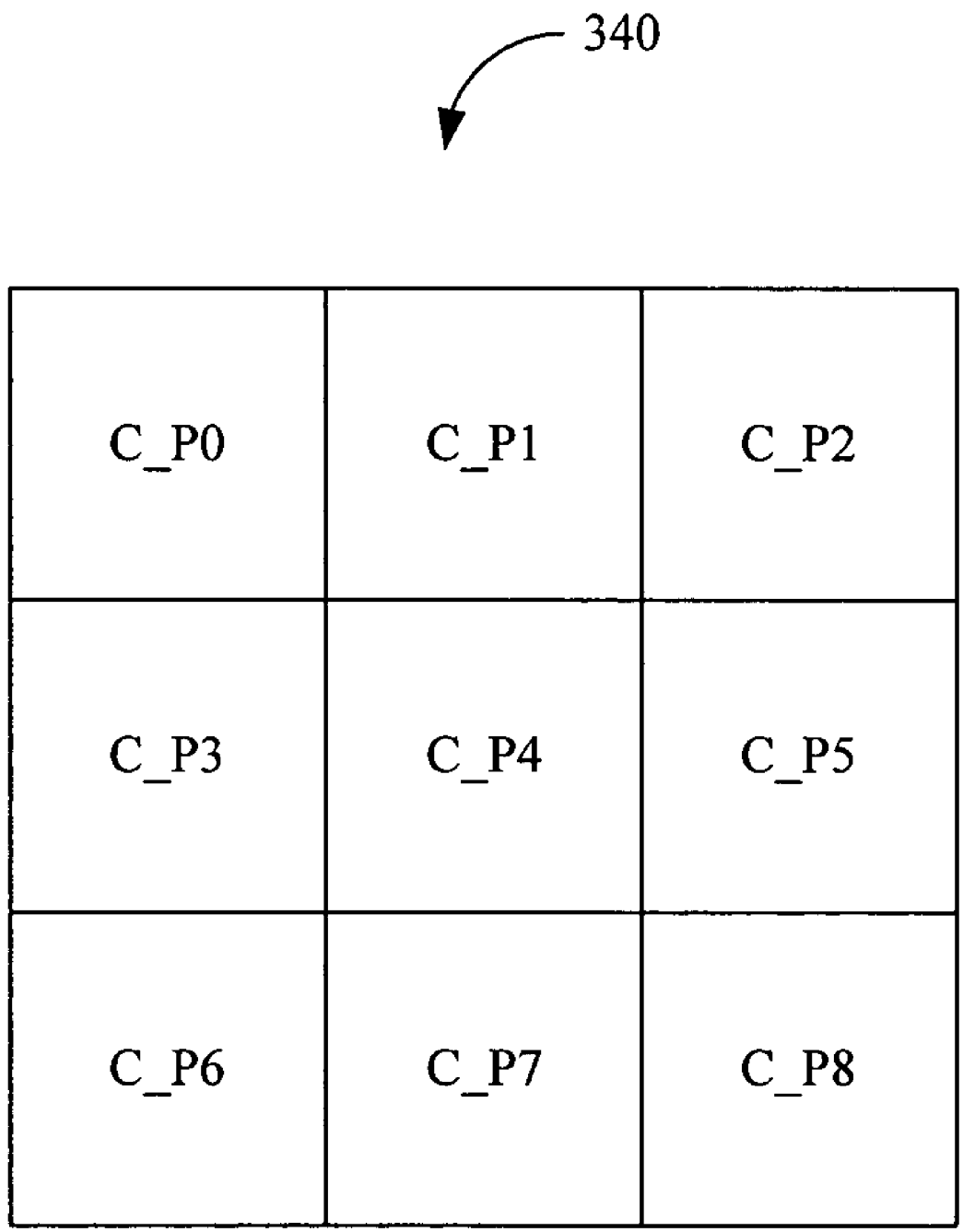
FIG. 6 is a smoothing filter in accordance with one embodiment of the present invention.

FIG. 6 illustrates smoothing filter 340. As explained above, smoothing filter 340 is a 3×3 filter, i.e. it makes use of nine (which is equal to 3 times 3) consolidated pixels. However other embodiments of the present invention can use filters of a different size, which subsequently needs a different number of consolidated pixels. The number of consolidated pixels is equal to the size of the smoothing filter. Smoothing filter 340 is formed by calculating the consolidated pixel centered at the position of the current pixel P(i,j), and eight consolidated pixels around the current pixel P(i,j). As shown in FIG. 6, the center entry C_P4 represents the consolidated pixel calculated centered at the position of the current pixel P(i,j), and the entries C_P0, C_P1, C_P2, C_P3, C_P5, C_P6, C_P7 and C_P8 are the consolidated pixels calculated at the positions above left, above center, above right, left center, right center, below left, below center and below right of current pixel P(i,j), respectively. Consolidated pixels C_P0, C_P1 and C_P2 are calculated using the pixels in line i−1 (i.e. the previous line) of the frame. Consolidated pixels C_P3, C_P4 and C_P5 are calculated using the pixels in line i (i.e., the current line) of the frame. Consolidated pixels C_P6, C_P7 and C_P8 are calculated using the pixels in line i+1 (i.e. the next line) of the frame.

Consolidation ranges of consecutive consolidated pixels in the same line are adjacent to each other. For example, if the consolidation range size is equal to 2, then consolidated pixel C_P4, which is calculated centered at the current pixel P(i,j) is equal to the normalization of the current pixel P(i,j), half of pixel P(i,j−1), and half of pixel P(i,j+1). Equation EQ1 shows symbolically how to calculate consolidated pixel C_P4, when consolidation size CS is equal to 2.

$$C\_P4 = \{P(i,j) + [P(i,j-1) + P(i,j+1)]/2\}/2 \quad (EQ1)$$

The consolidation range for the consolidated pixel C_P3 is to the left of the consolidation range of consolidated pixel C_P4 and includes half of pixel P(i,j−1), pixel P(i,j−2) and half of pixel P(i,j−3). Equation EQ2 shows symbolically how to calculate consolidated pixel C_P3, when consolidation size CS is equal to 2.

$$C\_P3 = \{P(i,j-2) + [P(i,j-1) + P(i,j-3)]/2\}/2 \quad (EQ2)$$

The consolidation range for consolidated pixel C_P5 is to the right of the consolidation range of consolidated pixel C_P4 and includes half of pixel P(i,j+1), pixel P(i,j+2), and half of pixel P(i,j+3), Equation EQ3 shows symbolically how to calculate consolidated pixel C_P5, when consolidation size CS is equal to 2.

$$C\_P5 = \{P(i,j+2) + [P(i,j+1) + P(i,j+3)]/2\}/2 \quad (EQ3)$$

Similarly, consolidated pixels C_P0, C_P1 and C_P2 are calculated using pixels above the pixels used by consolidated pixels C_P3, C_P4 and C_P5, respectively, and consolidated pixels C_P6, C_P7 and C_P8 are calculated using pixels below the pixels used by consolidated pixels C_P3, C_P4 and C_P5. Equations EQ4, EQ5, EQ6, EQ7, EQ8, and EQ9 shows symbolically how to calculate consolidated pixels C_P0, C_P1, C_P2 , CP_P6, C_P7, and C_P8, respectively, when consolidation size CS is equal to 2.

$$C\_P0 = \{P(i-1,j-2) + [P(i-1,j-1) + P(i-1,j-3)]/2\}/2 \quad (EQ4)$$

$$C\_P1 = \{P(i-1,j) + [P(i-1,j-1) + P(i-1,j+1)]/2\}/2 \quad (EQ5)$$

$$C\_P2 = \{P(i-1,j+2) + [P(i-1,j+1) + P(i-1,j+3)]/2\}/2 \quad (EQ6)$$

$$C\_P6 = \{P(i+1,j-2) + [P(i+1,j-1) + P(i+1,j-3)]/2\}/2 \quad (EQ7)$$

$$C\_P7 = \{P(i+1,j) + [P(i+1,j-1) + P(i+1,j+1)]/2\}/2 \quad (EQ8)$$

$$C\_P8 = \{P(i+1,j+2) + [P(i+1,j+1) + P(i+1,j+3)]/2\}/2 \quad (EQ9)$$

Equation EQ10 shows symbolically how to calculate consolidated pixel C_P4, when consolidation size CS is an arbitrary positive real number. In equation EQ10, z is equal to the integer portion of half the sum of the consolidation size CS plus 1 (i.e., z=int((CS+1)/2)).

$$C\_P4 = \frac{[p(i,j+z) + p(i,j-z)] * \frac{[CS - (2*z-1)]}{2} + \sum_{n=j-z+1}^{j+z-1} p(i,n)}{CS} \quad (EQ10)$$

The summation portion of equation EQ10 adds the luminance values of the whole pixels in the consolidation range. The factor [CS−(2*z−1)]/2 is called the partial pixel portion PPP, which represents the portion of the pixel p(i,j+z) and pixel p(i,j−z) that are part of the consolidation range. For example if consolidation size CS is equal to 2, partial pixel portion PPP is equal to 0.5, thus half of pixel P(i,j−1) and half of pixel P(i,j+1) are in the consolidation range and should be used with pixel P(i,j) to calculate consolidated pixel C_P4. When consolidation size CS is equal to an odd integer, partial pixel portion PPP is equal to 0, which indicates that pixel p(i,j+z) and pixel p(i,j−z) are just outside of the consolidation range and are not used to calculate the value of consolidated pixel C_P4.

The consolidation range of consolidated pixel C_P3 ends within pixel p(i,j−z) (or just after pixel p(i,j−z) if CS is an odd integer). Because consolidated pixels are adjacent to each other, the portion of pixel p(i,j−z) that is within the consolidation range of consolidated pixel C_P3 is the portion of pixel p(i,j−z) that is not in the consolidation range of consolidated pixel C_P4. Thus, the portion of pixel p(i,j−z) that is within the consolidation range of consolidated pixel C_P3 is equal to {1−[CS−(2*z−1)]/2}. The consolidation range of consolidated pixel C_P3 begins within pixel p(i,j−zl), where zl is equal to the integer portion of the sum of 1.5 times consolidation size CS and 0.5 (i.e., zl=int(1.5*CS+0.5)). The amount of pixel p(i,j−zl) that is in the consolidation range of consolidated pixel C_P3 is equal to the consolidation size minus the number of whole pixels minus the amount of pixel p(i,j−z) that is in the consolidation range of consolidated pixel C_P3. This amount can be calculated as ((CS−(1−(CS−(2*z−1))/2)−int((CS−(1−(CS−(2*z−1))/2)), which simplifies to (1.5*CS−1.5+z)−int(1.5*CS−1.5+z). Equation EQ11 shows symbolically how to calculate consolidated pixel C_P3. In Equation EQ11, PA(zl) is the amount of pixel p(i,j−zl) that is in the consolidation range i.e. PA(zl)=(1.5*CS−1.5+z)−int (1.5*CS−1.5+z), as described above).

$$C\_P3 = \frac{\{p(i,j-zl) * PA(zl) + p(i,j-z) * \left(1 - \frac{(CS-(2*z-1))}{2}\right) + \sum_{n=j-zl+1}^{j-(z+1)} p(i,n)\}}{CS} \quad (EQ11)$$

Similar reasoning can be used to derive the equations to calculate consolidated pixel C_P5, which is provided in equation EQ12. As in Equation EQ11, PA(z1)=(1.5*CS−1.5+z)−int(1.5*CS−1.5+z).

$$C\_P3 = \frac{\{p(i, j+z1) * PA(z1) + p(i, j+z) * \left(1 - \frac{(CS - (2*z-1))}{2}\right) + \sum_{n=j-z1+1}^{j-z1+1} p(i, n)\}}{CS} \quad (EQ12)$$

Consolidated pixels C_P0, C_P1, and C_P2 can be calculated by replacing "i" with "i−1" in equations EQ11, EQ10, and EQ12, respectively (i.e., using pixels above the pixels used to calculate consolidated pixels C_P3, C_P4, and C_P5). Similarly, Consolidated pixels C_P6, C_P7, and C_P8 can be calculated by replacing "i" with "i+1" in equations EQ11, EQ10, and EQ12, respectively (i.e., using pixels below the pixels used to calculate consolidated pixels C_P3, C_P4, and C_P5).

In general, larger consolidation sizes should be used to catch edges having smaller slopes. However, large consolidation size may cause blurring of the frame. Thus, most embodiments of the present invention use consolidation sizes in the range of 1 to 5, inclusive. Furthermore, choosing consolidation sizes equal to odd integer values results in lower computational overhead because only whole pixels are included in the consolidation range. When consolidation size CS is an odd integer, the value (CS−1)/2+1 is always an integer. Thus, z which equals int((CS−1)/2+1) is the same as just ((CS−1)/2+1). Therefore partial pixel portion PPP of consolidated pixel C_P4 is equal to [CS−(2*z−1)] would be equal to zero. Thus equation EQ10 can be simplified into equation EQ13, which shows symbolically how to calculate consolidated pixel C_P4 when consolidation size CS is a positive odd integer.

$$C\_P4 = \frac{\sum_{n=j-z+1}^{j+z-1} p(i, n)}{CS} \quad (EQ13)$$

Similarly, equation EQ11 can be simplified into equation EQ14, which shows how to calculate consolidated pixel C_P3, when consolidation size CS is a positive odd integer.

$$C\_P3 = \frac{p(i, j-z) + \sum_{n=j-z1+1}^{j-(z+1)} p(i, n)}{CS} \quad (EQ14)$$

which can be further simplified to equation EQ15.

$$C\_P3 = \frac{\sum_{n=j-z1+1}^{j-z} p(i, n)}{CS} \quad (EQ15)$$

Similarly, equation EQ12 can be simplified to equation EQ16, which shows symbolically how to calculate consolidated pixel C_P5 when consolidation size CS is a positive odd integer.

$$C\_P5 = \frac{\sum_{n=j+z}^{j+z1-1} p(i, n)}{CS} \quad (EQ16)$$

When consolidation size CS is a positive odd integer, consolidated pixels C_P0, C_P1, and C_P2 can be calculated by replacing "i" with "i−1" in equations EQ15, EQ13, and EQ16, respectively (i.e., using pixels above the pixels used to calculate consolidated pixels C_P3, C_P4, and C_P5). Similarly, when consolidation size CS is a positive odd integer, consolidated pixels C_P6, C_P7, and C_P8 can be calculated by replacing "i" with "i+1" in equations EQ15, EQ13, and EQ16, respectively (i.e., using pixels below the pixels used to calculate consolidated pixels C_P3, C_P4, and C_P5).

Figure 5:
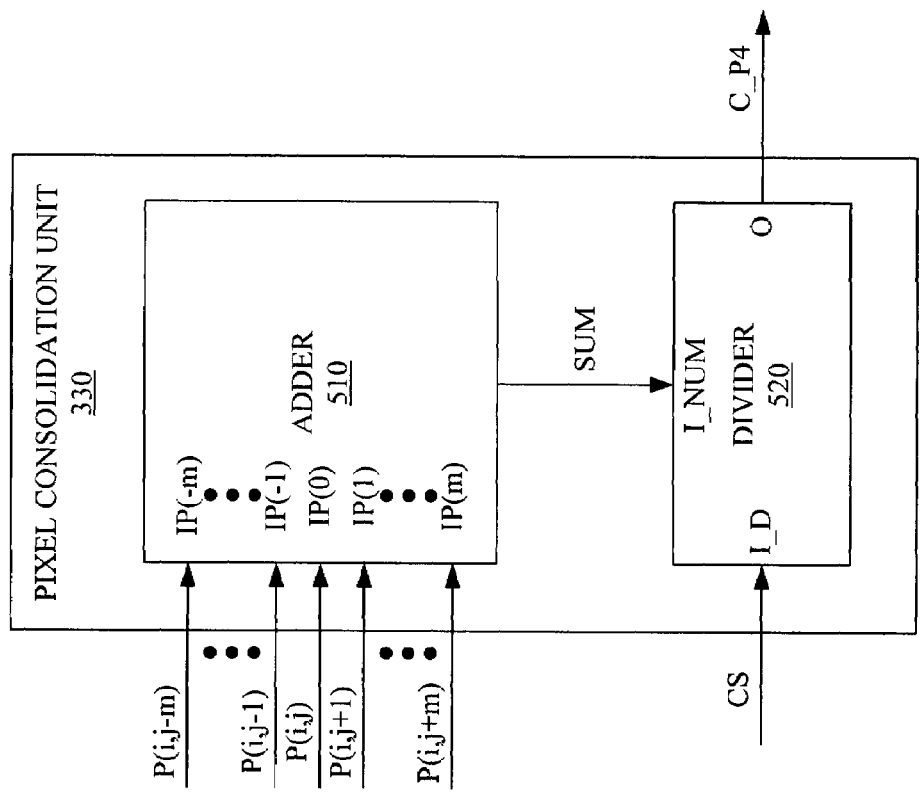
FIG. 5 is block diagram of a pixel consolidation unit in accordance with one embodiment of the present invention.

FIG. 5 is a block diagram for a pixel consolidation unit 330 designed for consolidation size CS being equal to a positive odd integer number. Specifically, consolidation size CS is equal to 2*m+1, where m is zero or a positive integer. Pixel consolidation unit 330 includes an adder 510 and a divider 520. Adder 510 has 2*m+1 input ports I_P(−m) . . . I_P(−1), I_P(0), I_P(1), . . . I_P(m). Adder 510 adds the values from input ports I_P(−m) . . . I_P(−1), I_P(0), I_P(1), . . . I_P(m) to generate an output sum SUM that is provided to a numerator input port I NUM of divider 520. Divider 520 divides the value at numerator input port I NUM by the value at a denominator input port I_D to generate an output value at output port O. As illustrated in FIG. 5, when pixels P(i,j−m), . . . , P(i,j−1), P(i,j), P(i,j+1), . . . , P(i,j+m) are applied on input ports I_P(−m) . . . I_P(−1), I_P(0), I_P(1), . . . I_P(m) of adder 510, respectively, and consolidation size CS is applied on denominator input port I_D of divider 520, pixel consolidation unit 330 provides consolidated pixel C_P4 at output port O of divider 520. Pixel consolidation unit 330 can be used to generate the other consolidation pixels of filter 340 by applying the appropriate pixels (as provided by equations EQ13, EQ15, and EQ16) to the input ports of adder 510.

As stated above, edge detection unit 350 determines the dominant and secondary edges in smoothing filter 340. Specifically, an edge measure is calculated for each edge in a set of possible edges. Various edge measures can be used, for example one embodiment of the present invention uses slope across the edge as the edge measure. The edge with the highest edge measure is the dominant edge and the edge with the second highest edge measure is the secondary edge. In one embodiment of the present invention, the set of edges includes a vertical edge E_V, a horizontal edge E_H, a 45 degree edge E__45, and a 135 degree edge E__135. Other embodiments of the present invention may use different edges in the set of possible edges.

Figure 7:
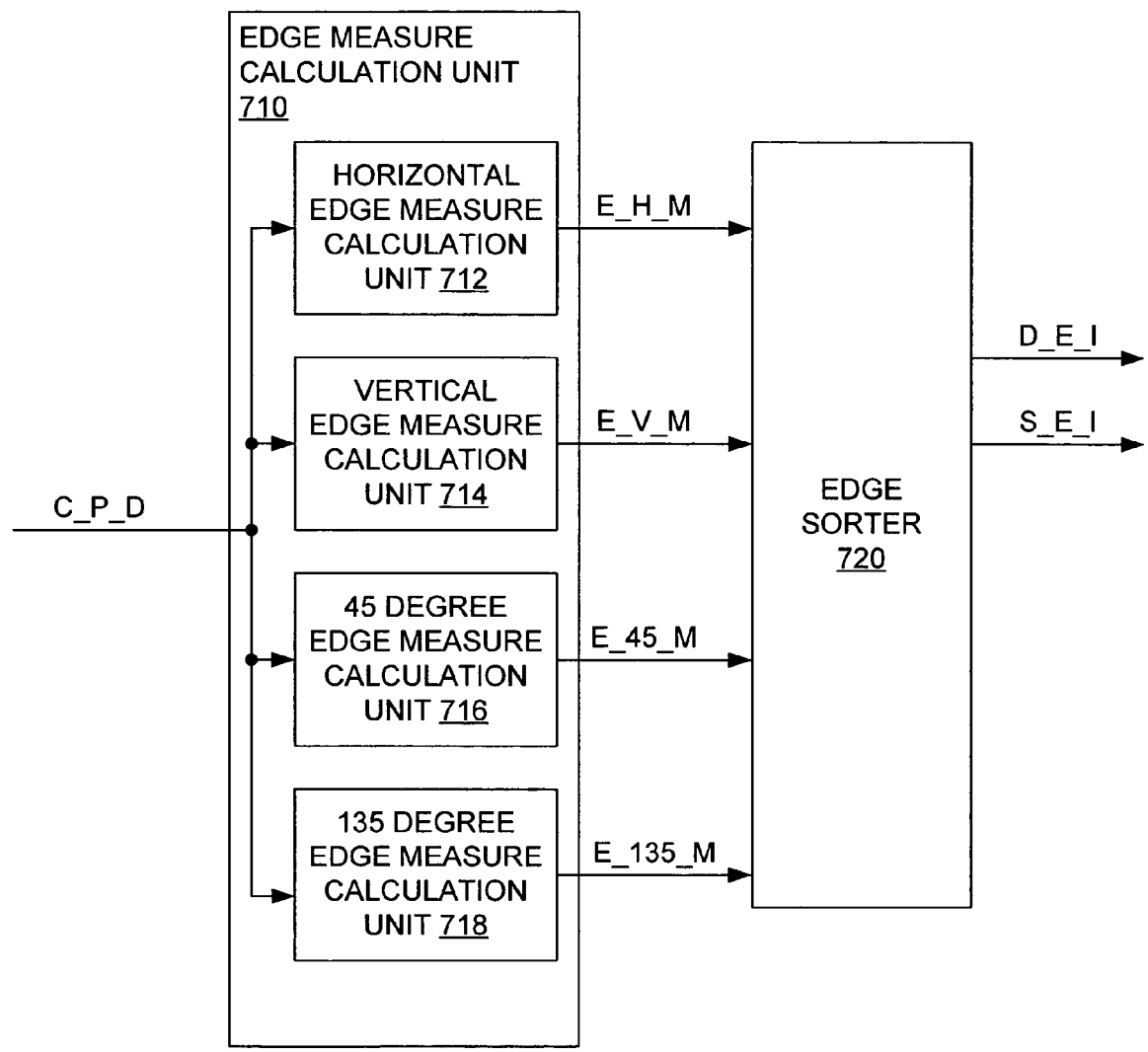
FIG. 7 is a block diagram of an edge detection unit in accordance with one embodiment of the present invention

FIG. 7 is a block diagram of an embodiment of an edge detection unit 700 in accordance with one embodiment of the present invention. Edge detection unit 700 includes an edge measure calculation unit 710 and an edge sorter 720. Edge measure calculation unit 710 includes a horizontal edge measure calculation unit 712 for calculating a horizontal edge measure E_H_M, a vertical edge measure calculation unit 714 for calculating a vertical edge measure E_V_M, a 45 degree edge measure calculation unit 716 for calculating a 45 degree edge measure E__45_M, and a 135 degree edge measure calculation unit 718 for calculating a 135 degree edge measure E__135_M. Edge detection unit 700 uses consolidated pixel data C_P_D from smoothing filter 340 (FIG. 3) to calculate the various edge measures. Edge sorter 720 sorts the edges based on the value of horizontal edge measure E_H_M, vertical edge measure E_V_M, 45 degree edge measure E_45_M, and 135 degree edge measure E_135_M. The edge with the largest edge measure is the dominant edge. The edge with the second largest edge measure is the secondary edge. Edge sorter 720 provides dominant edge information D_E_I, which includes a dominant edge measure D_E_M (not shown), which is equal to the largest edge measure and a dominant edge direction D_E_D (not shown), which corresponds to the direction of the edge with the largest edge measure. Edge sorter 720 also provides secondary edge information S_E_I, which includes a secondary edge measure S_E_M (not shown), which is equal to the second largest edge measure and a secondary edge direction S_E_D (not shown), which corresponds to the direction of the edge with the second largest edge measure. Some embodiments of the present invention do not make use of secondary edge information S_E_I. In these embodiments edge sorter 720 would not need to determine the secondary edge or secondary edge information S_E_I.

For the embodiment of FIG. 7, slopes within smoothing filter 340 are used as the edge measures. Slope and edge direction are actually offset by 90 degrees. Thus, horizontal edge measure E_H_M is a measure of the vertical slope of the consolidated pixels in smoothing filter 340. Specifically, equations EQ17, EQ18, EQ19, and EQ20 provides the formulas for calculating horizontal edge measure E_H_M, vertical edge measure E_V_M, 45 degree edge measure E_45_M, and 135 degree edge measure E_135_M, respectively.

$$E\_H\_M = \begin{vmatrix} (C\_P0 + C\_P1 + C\_P2 + C\_P3 + C\_P4 + \\ C\_P5) - 2*(C\_P6 + C\_P7 + C\_P8) \\ + \\ (C\_P6 + C\_P7 + C\_P8 + C\_P3 + C\_P4 + \\ C\_P5) - 2*(C\_P0 + C\_P1 + C\_P2) \end{vmatrix} \quad (EQ17)$$

$$E\_V\_M = \begin{vmatrix} (C\_P0 + C\_P3 + C\_P6 + C\_P1 + C\_P4 + \\ C\_P7) - 2*(C\_P2 + C\_P5 + C\_P8) \\ + \\ (C\_P2 + C\_P5 + C\_P8 + C\_P1 + C\_P4 + \\ C\_P7) - 2*(C\_P0 + C\_P3 + C\_P6) \end{vmatrix} \quad (EQ18)$$

$$E\_45\_M = \begin{vmatrix} (C\_P2 + C\_P4 + C\_P6 + C\_P0 + C\_P1 + \\ C\_P3) - 2*(C\_P5 + C\_P7 + C\_P8) \\ + \\ (C\_P2 + C\_P4 + C\_P6 + C\_P5 + C\_P7 + \\ C\_P8) - 2*(C\_P0 + C\_P1 + C\_P3) \end{vmatrix} \quad (EQ19)$$

$$E\_135\_M = \begin{vmatrix} (C\_P0 + C\_P4 + C\_P8 + C\_P1 + C\_P2 + \\ C\_P5) - 2*(C\_P3 + C\_P6 + C\_P7) \\ + \\ (C\_P0 + C\_P4 + C\_P8 + C\_P3 + C\_P6 + \\ C\_P7) - 2*(C\_P1 + C\_P2 + C\_P5) \end{vmatrix} \quad (EQ20)$$

Figure 8:
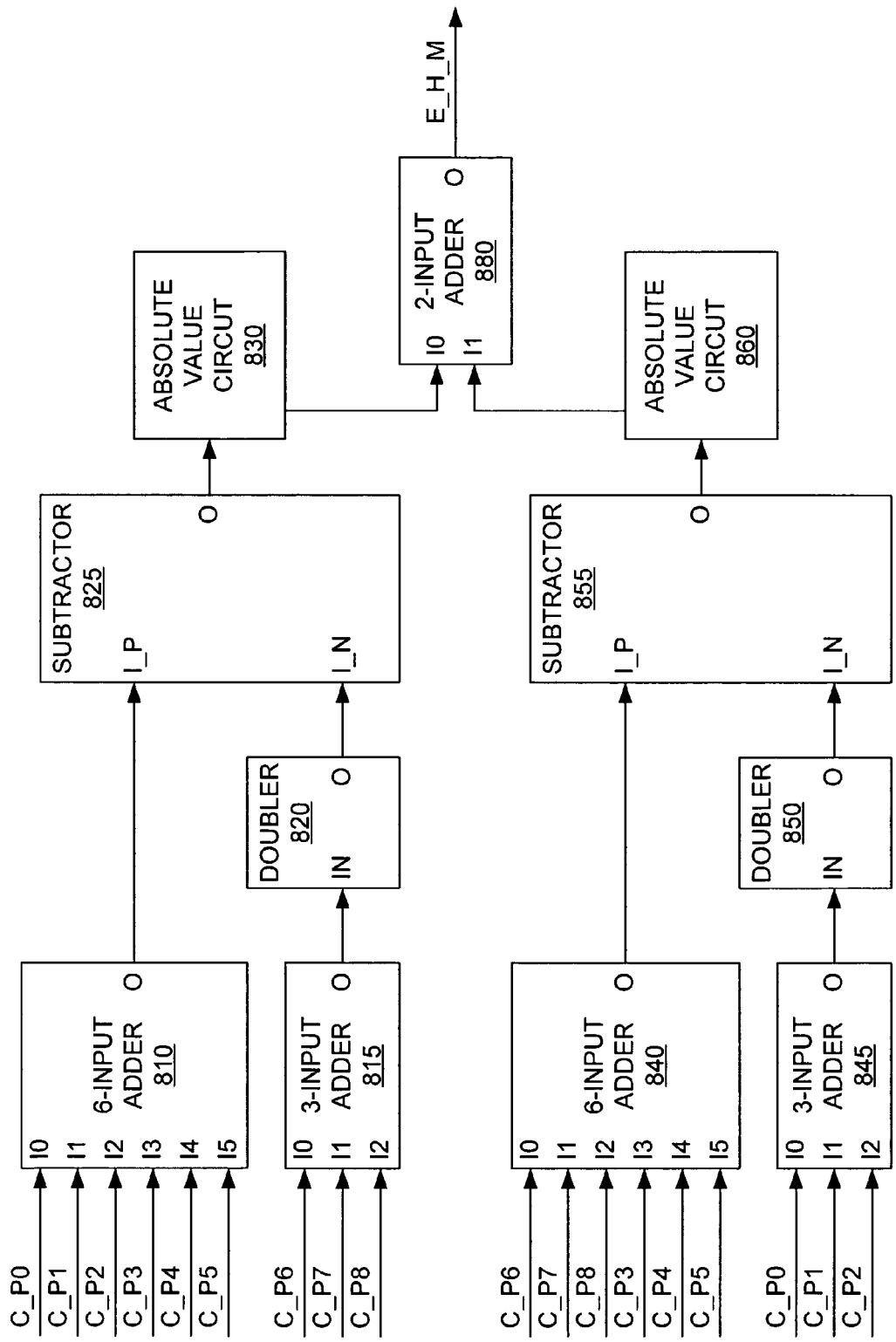
FIG. 8 is a block diagram of an edge measure calculation unit in accordance with one embodiment of the present invention.

FIG. 8 is a block diagram of a horizontal edge measure calculation unit 712, which includes a 6-input adder 810, a 3-input adder 815, a doubler 820, a subtractor 825, an absolute value circuit 830, a 6-input adder 840, a 3-input adder 845, a doubler 850, a subtractor 855, an absolute value circuit 860, and a 2-input adder 880. 6-input adder 810 has six input ports I0, I1, I2, I3, I4, and I5, which receive consolidated pixels C_P0, C_P1, C_P2, C_P3, C_P4, C_P5, respectively.

6-input adder 810 adds the values from input ports I0-I5 and generates an output sum at output port O, which is coupled to a positive input port I_P of subtractor 825. 3-input adder 815 has three input ports I0, I1, and I2, which receive consolidated pixels C_P6, C_P7, and C_P8, respectively. 3-input adder 815 adds the values from input ports I0, I1, and I2 and generates an output sum at output port O, which is coupled to an input port IN of doubler 820. Doubler 820 doubles the value at input port IN and outputs the result on output port O, which is coupled a negative input port I_N of subtractor 825. Doubler 820 could be for example a shift register configured to shift the input value by one bit to the left. Subtractor 825 generates a difference at output port O equal to the value at positive input port I_P minus the value at negative input port I_N. Output port O of subtractor 825 is coupled to an input port of absolute value circuit 830, which provides the absolute value of the input value to an input port I0 of 2-input adder 880.

6-input adder 840 has six input ports I0, I1, I2, I3, I4, and I5, which receive consolidated pixels C_P6, C_P7, C_P8, C_P3, C_P4, C_P5, respectively. 6-input adder 840 adds the values from input ports I0-I5 and generates an output sum at output port O, which is coupled to a positive input port I_P of subtractor 855. 3-input adder 845 has three input ports I0, I1, and I2, which receive consolidated pixels C_P0, C_P1, and C_P2, respectively. 3-input adder 845 adds the values from input ports I0, I1, and I2 and generates an output sum at output port O, which is coupled to an input port IN of doubler 850. Doubler 850 doubles the value at input port IN and outputs the result on output port O, which is coupled a negative input port I_N of subtractor 855. Doubler 850 could be for example a shift register configured to shift the input value by one bit to the left. Subtractor 855 generates a difference at output port O equal to the value at positive input port I_P minus the value at negative input port I_N. Output port O of subtractor 855 is coupled to an input port of absolute value circuit 860, which provides the absolute value of the input value to an input port I1 of 2-input adder 880. 2-input adder 880 adds the values from input port I0 and input port I1 to generate an horizontal edge measure E_H_M on output port O. Vertical edge measure calculation unit 714, 45 degree edge measure calculation unit 716, and 135 degree edge measure calculation unit 718 can use the same circuitry as illustrated in FIG. 8. However, the appropriate consolidated pixel values would need to be supplied to the input ports of the adders. One skilled in the art can easily make these modifications by referring to equations EQ17, EQ18, EQ19, and EQ20.

Figure 9A:
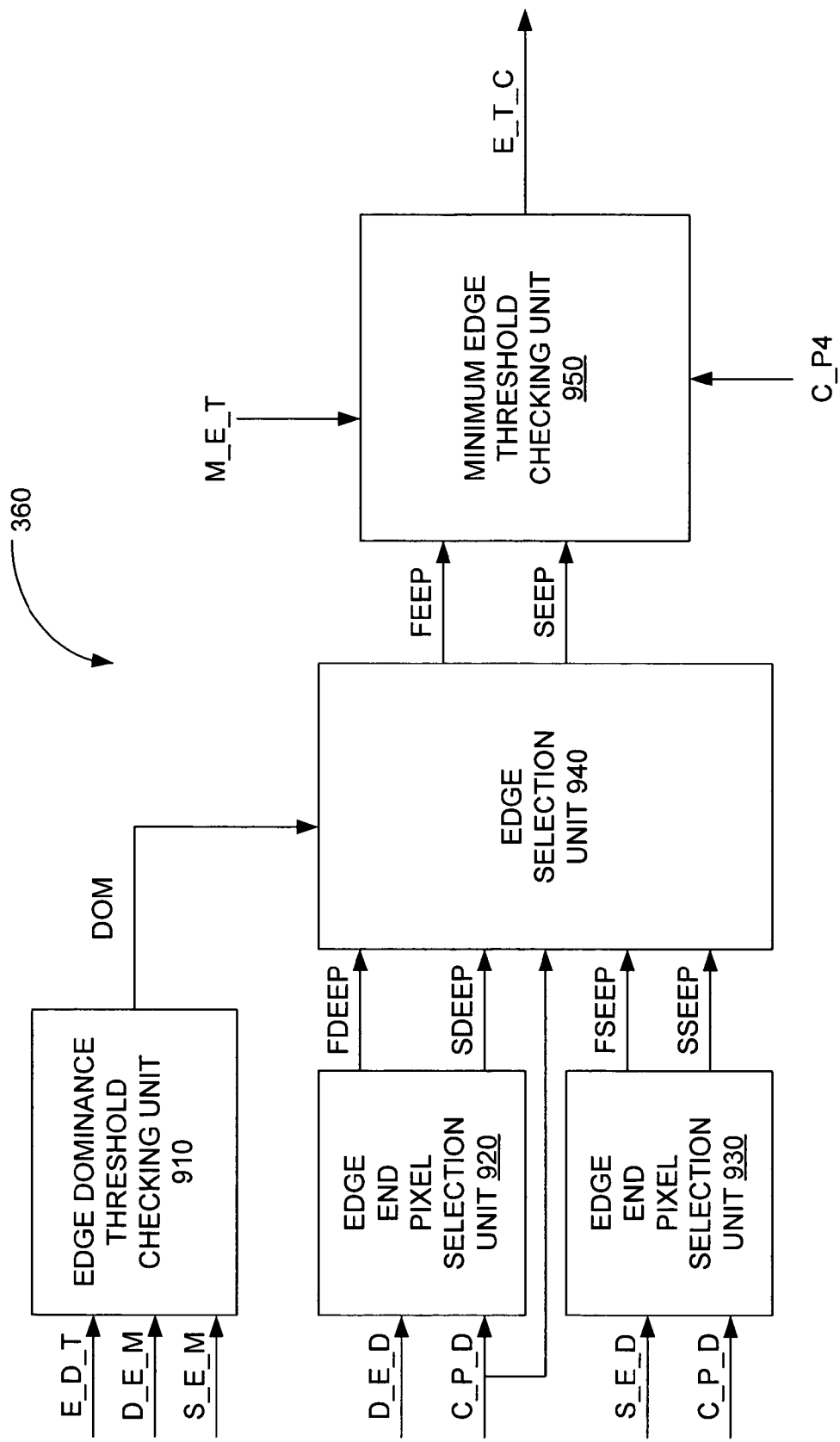
FIG. 9(a)-9(f) are block diagrams of an edge threshold checking unit and the components of the edge-threshold checking unit in accordance with one embodiment of the present invention.
Figure 9B:
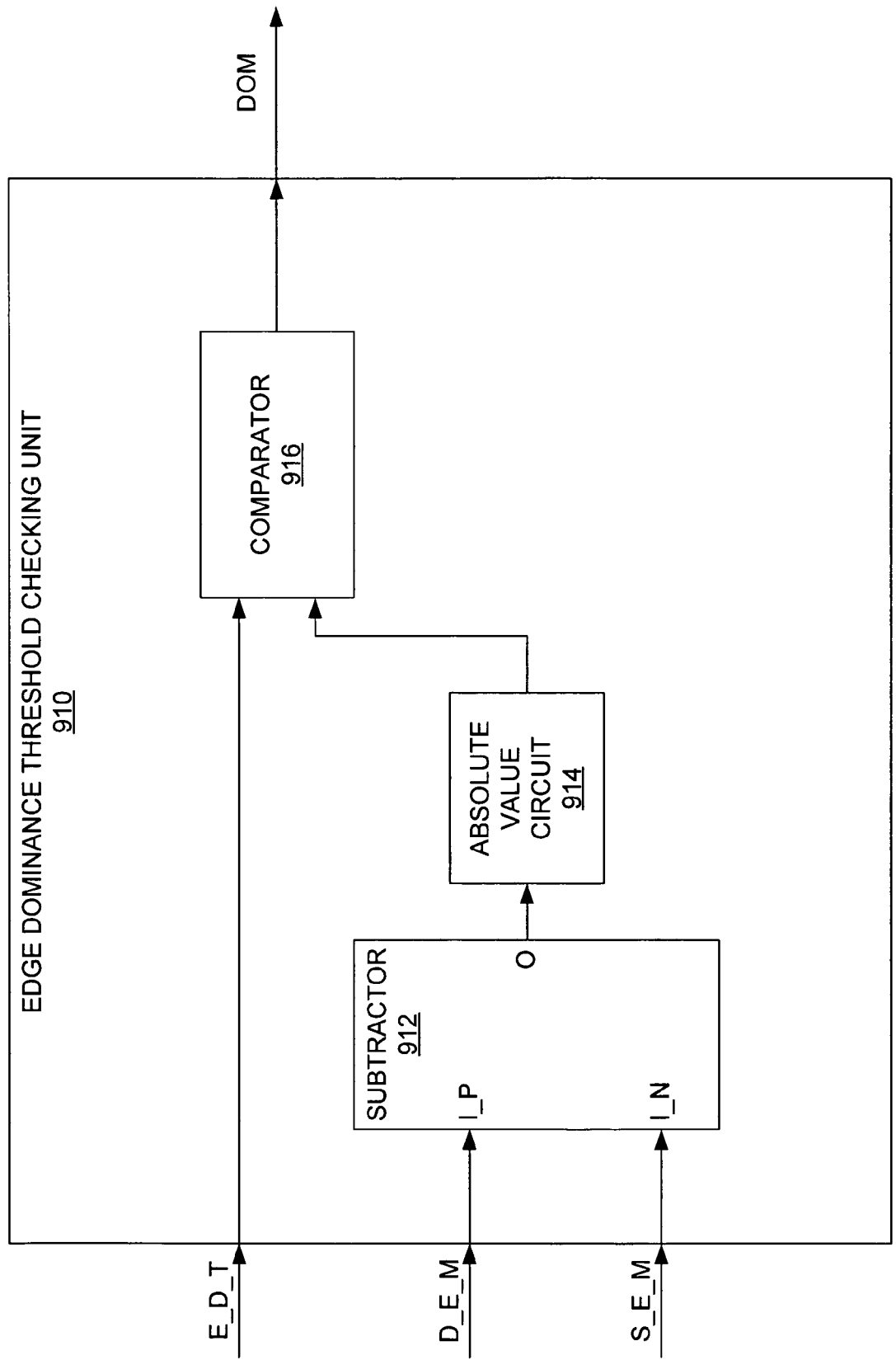
Figure 9C:
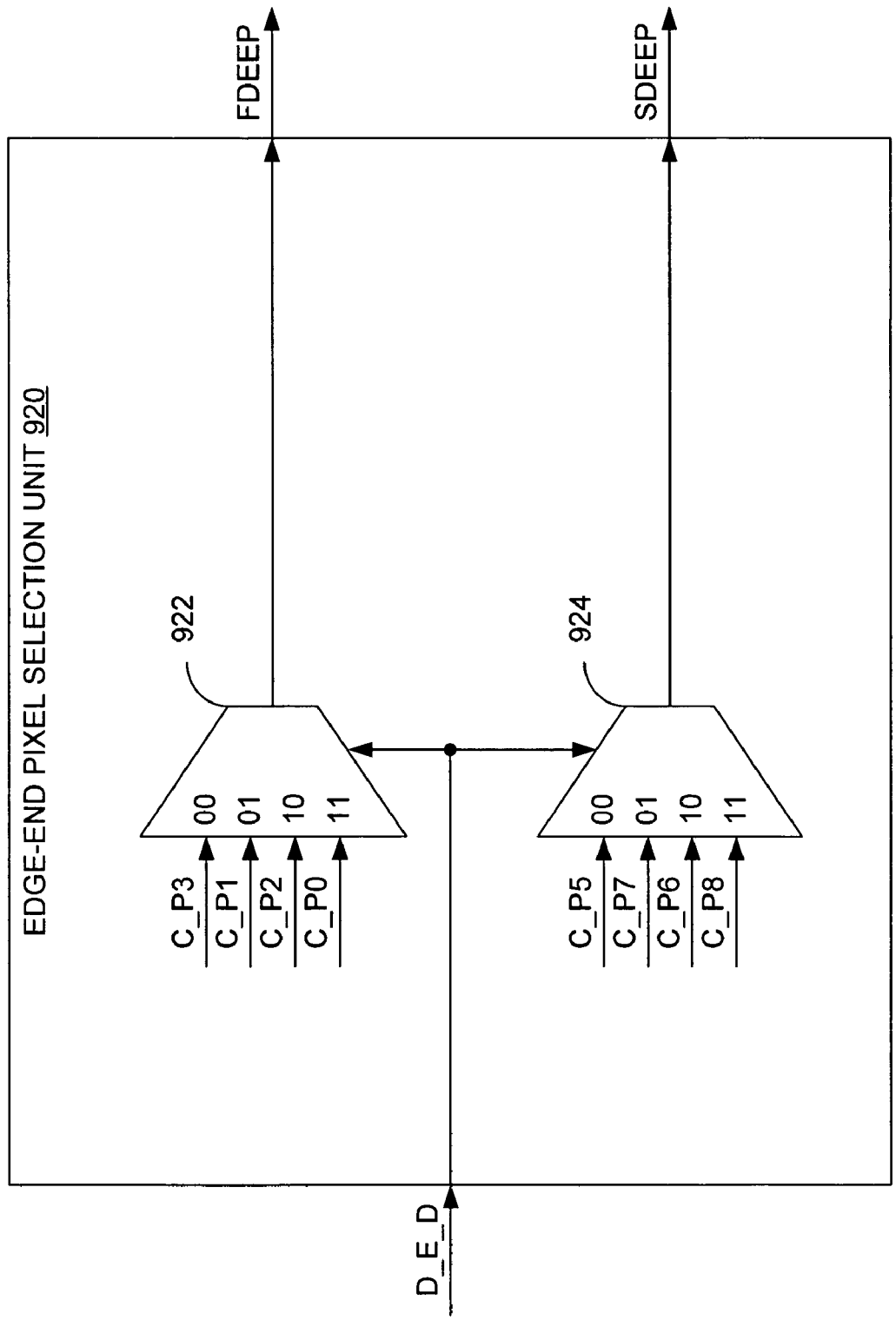
Figure 9D:
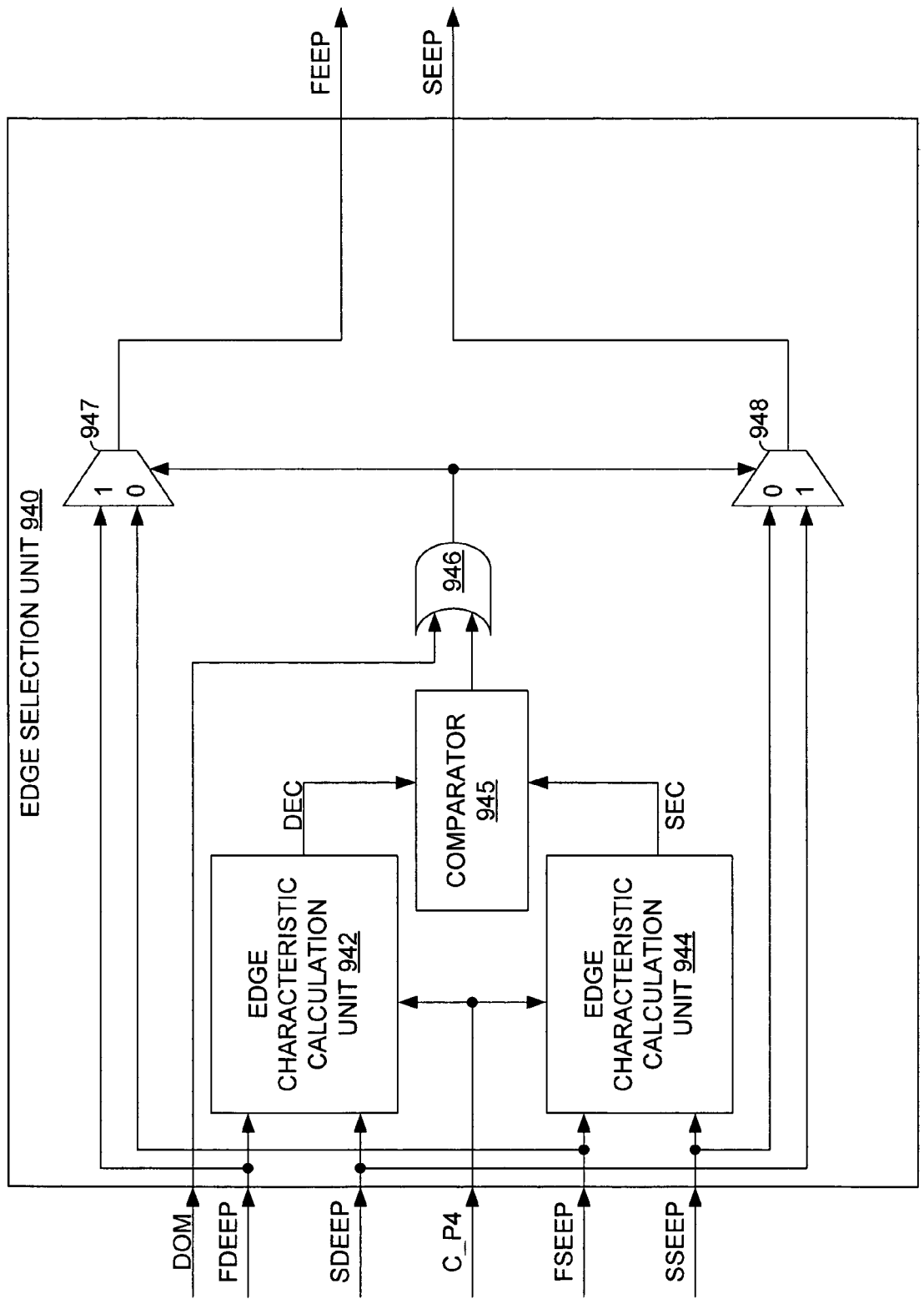

FIG. 9(a) is a block diagram of one embodiment of Edge threshold checking unit 360 (FIG. 3). The embodiment of FIG. 9 includes an edge dominance threshold checking unit 910, an edge end pixel selection unit 920, an edge end pixel selection unit 930, an edge selection unit 940, and a minimum edge threshold checking unit 950. Edge dominance threshold checking unit determines whether the dominant edge is significantly greater than the secondary edge. Specifically, edge dominance threshold checking unit 910 compares the absolute value of the difference between dominant edge measure D_E_M and secondary edge measure S_E_M against an edge dominance threshold E_D_T. When the absolute value of the difference between dominant edge measure D_E_M and secondary edge measure S_E_M is less than or equal to edge dominance threshold E_D_T, edge dominant threshold checking unit 910 drives a dominance signal DOM to a not dominant logic state (typically logic low), which signifies that the dominant edge found by edge detection unit 350 does not significantly stronger than the secondary edge. Thus, further processing should be performed to determine whether the dominant edge or the secondary edge should be selected.

When the absolute value of the difference between dominant edge measure D_E_M and secondary edge measure S_E_M is greater than edge dominance threshold E_D_T, edge dominance threshold checking unit 910 drives dominance signal DOM to a dominant logic state (typically logic high), which signifies that the dominant edge is significantly stronger than the secondary edge. Dominance signal DOM is provided to edge selection unit 940, which is described below.

Edge end pixel selection units 920 and 930 select the consolidated pixels in smoothing filter 340 that are at the end of an edge in a given edge direction. As illustrated in FIG. 9(*a*), edge end pixel selection unit 920 is coupled to receive the dominant edge direction and selects a first dominant edge end pixel FDEEP and a second dominant edge end pixel SDEEP. Edge end pixel selection unit 930 is coupled to receive the secondary edge direction and selects a first secondary edge end pixel FSEEP and a second secondary edge end pixel SSEEP. Table 1 shows which two consolidated pixels selected for each edge direction. The order of the selected pixels (i.e. which pixel is the first versus the second) is not material in the embodiment of FIG. 9(*a*).

TABLE 1

| EDGE DIRECTION | SELECTED CONSOLIDATED PIXELS |
|---|---|
| HORIZONTAL | C_P3 and C_P5 |
| VERTICAL | C_P1 and C_P7 |
| 45 DEGREE | C_P2 and C_P6 |
| 135 DEGREE | C_P0 and C_P8 |

Edge selection unit 940 selects between the dominant edge and the secondary edge to determine the first edge end pixel and the second edge end pixel. Edge selection unit 940 receives dominance signal DOM from edge dominance threshold checking unit 910, first dominant edge end pixel FDEEP and second dominant edge end pixel SDEEP from edge end pixel selection unit 920, consolidated pixel data from smoothing filter 340 (FIG. 3), and first secondary edge end pixel FSEEP and second secondary edge end pixel SSEEP from edge end pixel selection unit 930. When dominance signal DOM is in the dominant logic state, edge selection unit 940 selects the dominant edge; therefore, first edge end pixel FEEP is equal to first dominant edge end pixel FDEEP and second edge end pixel SEEP is equal to second dominant edge end pixel SDEEP. When dominance signal DOM is in the not dominant logic state, edge selection unit 940 computes a dominant edge characteristic DEC that is equal to the sum of the absolute value of consolidated pixel C_P4 minus first dominant edge end pixel FDEEP and the absolute value of consolidated pixel C_P4 minus the second dominant edge end pixel SDEEP. Equation EQ21 shows symbolically how to calculate dominant edge characteristic DEC.

$$DEC=|C\_P4-FDEEP|+|C\_P4-SDEEP| \quad (EQ21)$$

Edge selection unit 940 also computes a secondary edge characteristic SEC that is equal to the sum of the absolute value of consolidated pixel C_P4 minus first secondary edge end pixel FSEEP and the absolute value of consolidated pixel C_P4 minus the second secondary edge end pixel SSEEP. Equation EQ22 shows symbolically how to calculate secondary edge characteristic SEC.

$$SEC=|C\_P4-FSEEP|+C\_P4-SSEEP|(EQ22)$$

When dominance signal DOM is in the not dominant logic state and dominant edge characteristic DEC is greater than or equal to secondary edge characteristic SEC, edge selection unit 940 selects the dominant edge; therefore, first edge end pixel is equal to first dominant edge end pixel and second edge end pixel is equal to the second dominant edge end pixel. However, when dominance signal DOM is in the not dominant logic state and dominant edge characteristic DEC is less than secondary edge characteristic SEC, edge selection unit 940 selects the secondary edge; therefore, first edge end pixel FEEP is equal to first secondary edge end pixel FSEEP and second edge end pixel SEEP is equal to the second secondary edge end pixel SSEEP.

Minimum edge threshold checking unit 950 generates the edge threshold control signal based on the values of first edge end pixel FEEP, second edge end pixel SEEP, a minimum edge threshold M_E_T, and consolidated pixel C_P4. Specifically, the absolute value of consolidated pixel C_P4 minus first edge end pixel FEEP is greater than minimum edge threshold M_E_T or the absolute value of consolidated pixel C_P4 minus second edge end pixel SEEP is greater than minimum edge threshold M_E_T, edge threshold control signal E_T_C is driven to a threshold met logic state (typically logic high), which indicates that current pixel P(i,j) should be smoothed subject to other conditions described below. Otherwise, edge threshold control signal E_T_C is driven to a threshold failed logic state (typically logic low), which indicates that the current pixel P(i,j) should not be smoothed.

FIG. 9(*b*) is a block diagram of one embodiment of edge dominance threshold checking unit 910, which includes a subtractor 912, an absolute value circuit 914, and a comparator 916. Subtractor 912 receives dominant edge measure D_E_M on a positive input port I_P and receives secondary edge measure S_E_M on a negative input port I_N. Subtractor 912 generates a difference at output port O equal to the value at positive input port I_P minus the value at negative input port I_N. Output port O of subtractor 912 is coupled to an input port of absolute value circuit 914, which provides the absolute value of the input value to comparator 916, which also receives edge dominance threshold E_D_T. When the value from absolute value circuit 914 is less than or equal to edge dominance threshold E_D_T, comparator 916 drives a dominance signal DOM to a not dominant logic state (typically logic low). When the value from absolute value circuit 914 is greater than edge dominance threshold E_D_T, comparator 916 drives dominance signal DOM to a dominant logic state (typically logic high).

FIG. 9(*c*) is a block diagram of an embodiment of edge-end pixel selection unit 920. The embodiment of FIG. 9(*c*) includes a multiplexer 922 and a multiplexer 924. Multiplexer 922 has an output port, which generates first dominant edge end pixel FDEEP, and four input ports 00, 01, 10, and 11, which receives consolidated pixels C_P3, C_P1, C_P2, and C_P0, respectively. Similarly multiplexer 924 has an output port, which generates second dominant edge end pixel SDEEP, and 4 input ports 00, 01, 10, and 11, which receive consolidated pixels C_P5, C_P7, C_P6, and C_P8, respectively. Both multiplexer 922 and 924 are controlled by dominant edge direction D_E_D, which is encoded as two bits xy, with xy=00 being the horizontal direction, xy=01 being the vertical direction, xy=10 being the 45 degree direction, and xy=11 being the 135 degree direction. Multiplexer 922 and 924 are controlled by dominant edge direction D_E_D, so edge-end pixel selection unit 920 selects the consolidated pixels as shown in Table 1. Similarly edge end pixel selection unit 930 could be implemented with the circuit of FIG. 9(*c*) by applying the appropriate signals to the multiplexers.

FIG. 9(*d*) is a block diagram of an embodiment of edge selection unit 940. The embodiment of FIG. 9(*d*) includes an edge characteristic calculation unit 942, an edge characteristic calculation unit 944, a comparator 945, an OR gate 946, a multiplexer 947, and a multiplexer 948. Edge characteristic calculation unit 942, which receives first dominant edge end pixel FDEEP, second dominant edge end pixel SDEEP, and consolidated pixel C_P4, calculates dominant edge characteristic DEC, which is equal to the sum of the absolute value of consolidated pixel C_P4 minus first dominant edge end pixel FDEEP and the absolute value of consolidated pixel C_P4 minus the second dominant edge end pixel SDEEP (See equation EQ21 above). Edge characteristic calculation unit 944, which receives first secondary edge end pixel FSEEP, second secondary edge end pixel SSEEP, and consolidated pixel C_P4, calculates secondary edge characteristic SEC, which is equal to the sum of the absolute value of consolidated pixel C_P4 minus first secondary edge end pixel FSEEP and the absolute value of consolidated pixel C_P4 minus the second secondary edge end pixel SSEEP (See Equation EQ22). Comparator 945 receives dominant edge characteristic DEC and secondary edge characteristic SEC. When dominant edge characteristic DEC is greater than or equal to secondary edge characteristic SEC, comparator 945 drives a logic high to a first input terminal of OR gate 946; otherwise, comparator 945 drives a logic low to the first input terminal of OR gate 946. The second input terminal of OR gate 946 receives dominance signal DOM. The output terminal of OR gate 946 is coupled to the control terminals of multiplexer 947 and multiplexer 948. Multiplexer 947, which receives first dominant edge end pixel FDEEP on a logic 1 input port and first secondary edge end pixel FSEEP on a logic 0 input port provides first edge end pixel FEEP. Multiplexer 948, which receives second dominant edge end pixel SDEEP on a logic 1 input port and second secondary edge end pixel SSEEP on a logic 0 input port provides second edge end pixel SEEP.

Figure 9E:
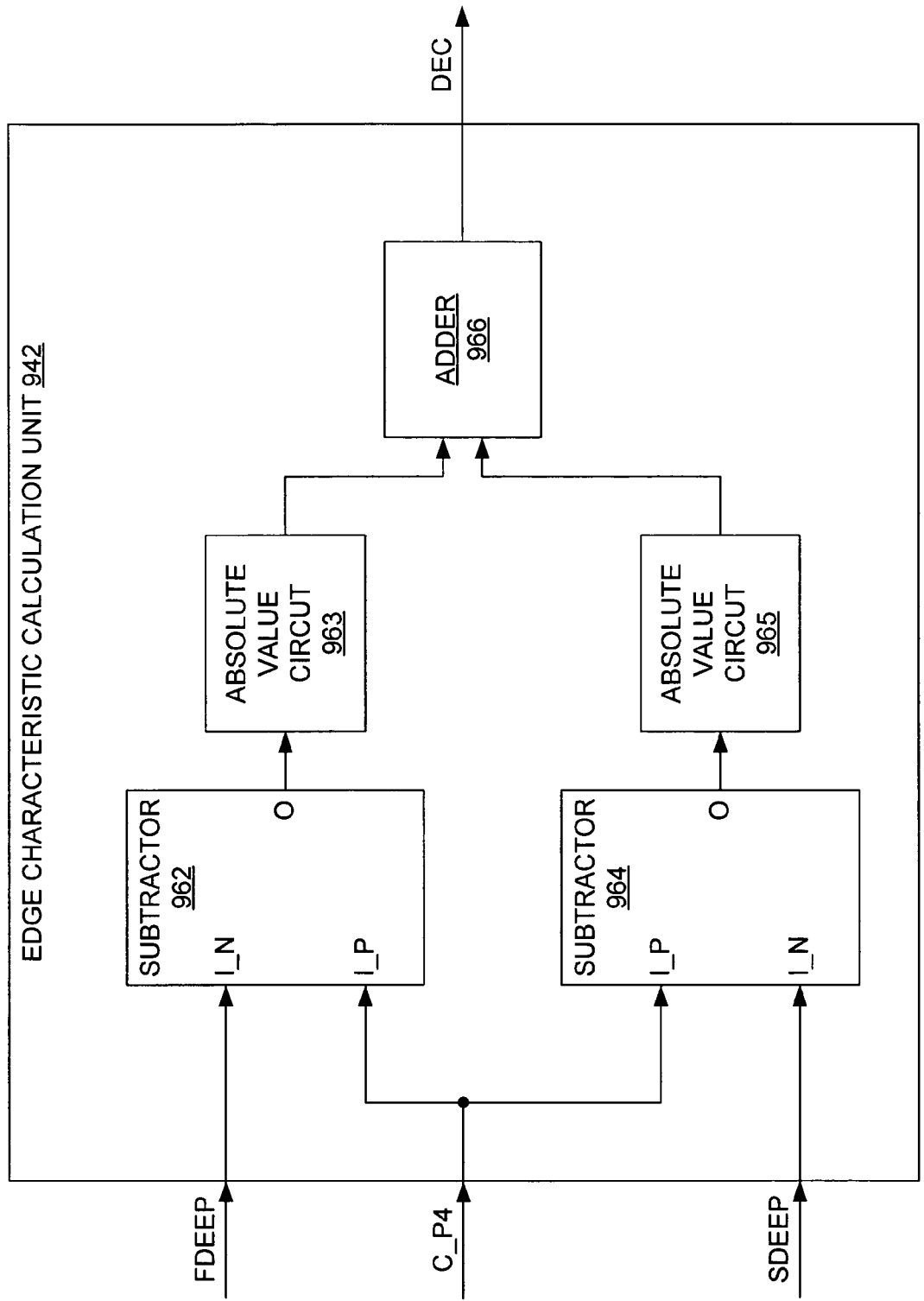

FIG. 9(e) is a block diagram of one embodiment of edge characteristic calculation unit 942. The embodiment of FIG. 9(e) includes a subtractor 962, an absolute value circuit 963, a subtractor 964, an absolute value circuit 965, and an adder 966. Subtractor 962 receives consolidated pixel C_P4 on a positive input port I_P and receives first dominant edge end pixel FDEEP on a negative input port I_N. Subtractor 962 generates a difference at output port O equal to the value at positive input port I_P minus the value at negative input port I_N. Output port O of subtractor 962 is coupled to an input port of absolute value circuit 963, which provides the absolute value of the input value to adder 966. Subtractor 964 receives consolidated pixel C_P4 on a positive input port I_P and receives second dominant edge end pixel SDEEP on a negative input port I_N. Subtractor 964 generates a difference at output port O equal to the value at positive input port I_P minus the value at negative input port I_N. Output port O of subtractor 964 is coupled to an input port of absolute value circuit 965, which provides the absolute value of the input value to adder 966. Adder 966 adds the values from absolute value circuit 963 and absolute value circuit 965 to generate dominant edge characteristic DEC. The circuit of FIG. 9(e) can also be used for edge characteristic calculation unit 944.

Figure 9F:
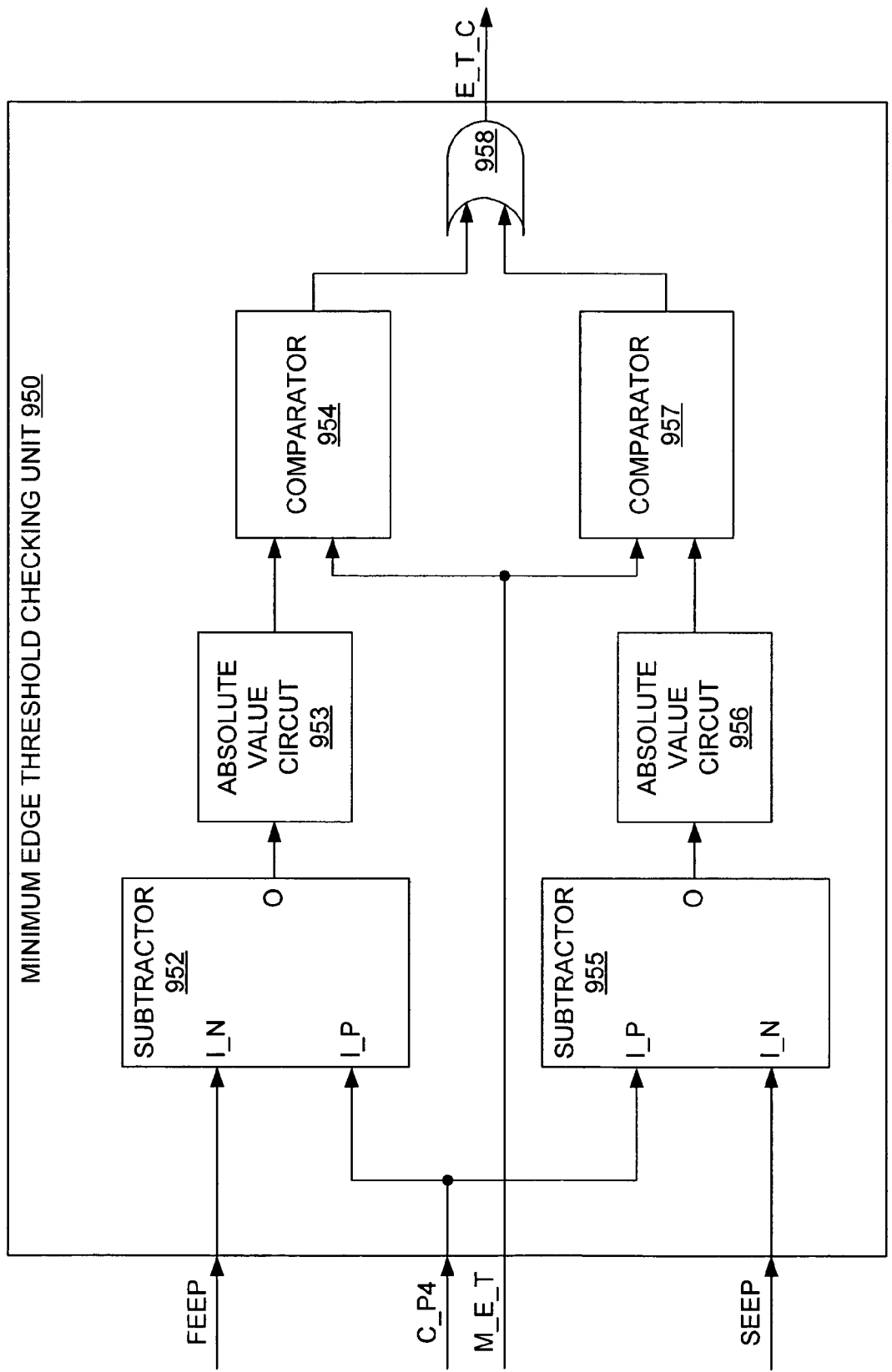

FIG. 9(f) is a block diagram of one embodiment of minimum edge threshold checking unit 950. The embodiment of FIG. 9(f) includes a subtractor 952, an absolute value circuit 953, a comparator 954, a subtractor 955, an absolute value circuit 956, a comparator 957, and an OR gate 958. Subtractor 952 receives consolidated pixel C_P4 on a positive input port I_P and receives first edge end pixel FEEP on a negative input port I_N. Subtractor 952 generates a difference at output port O equal to the value at positive input port I_P minus the value at negative input port I_N. Output port O of subtractor 952 is coupled to an input port of absolute value circuit 953, which provides the absolute value of the input value to comparator 954. Comparator 954, which also receives minimum edge threshold M_E_T, outputs a logic high to a first input terminal of OR gate 958 when the value from absolute value circuit 953 is greater than minimum edge threshold M_E_T; otherwise comparator 954 generates a logic low to the first input terminal of OR gate 958. Subtractor 955 receives consolidated pixel C_P4 on a positive input port I_P and receives second edge end pixel SEEP on a negative input port I_N. Subtractor 955 generates a difference at output port O equal to the value at positive input port I_P minus the value at negative input port I_N. Output port O of subtractor 955 is coupled to an input port of absolute value circuit 956, which provides the absolute value of the input value to comparator 957. Comparator 957, which also receives minimum edge threshold M_E_T, outputs a logic high to a second input terminal of OR gate 958 when the value from absolute value circuit 956 is greater than minimum edge threshold M_E_T; otherwise comparator 957 generates a logic low to the second input terminal of OR gate 958. OR gate 958 provides edge threshold control signal E_T_C.

Figure 10:
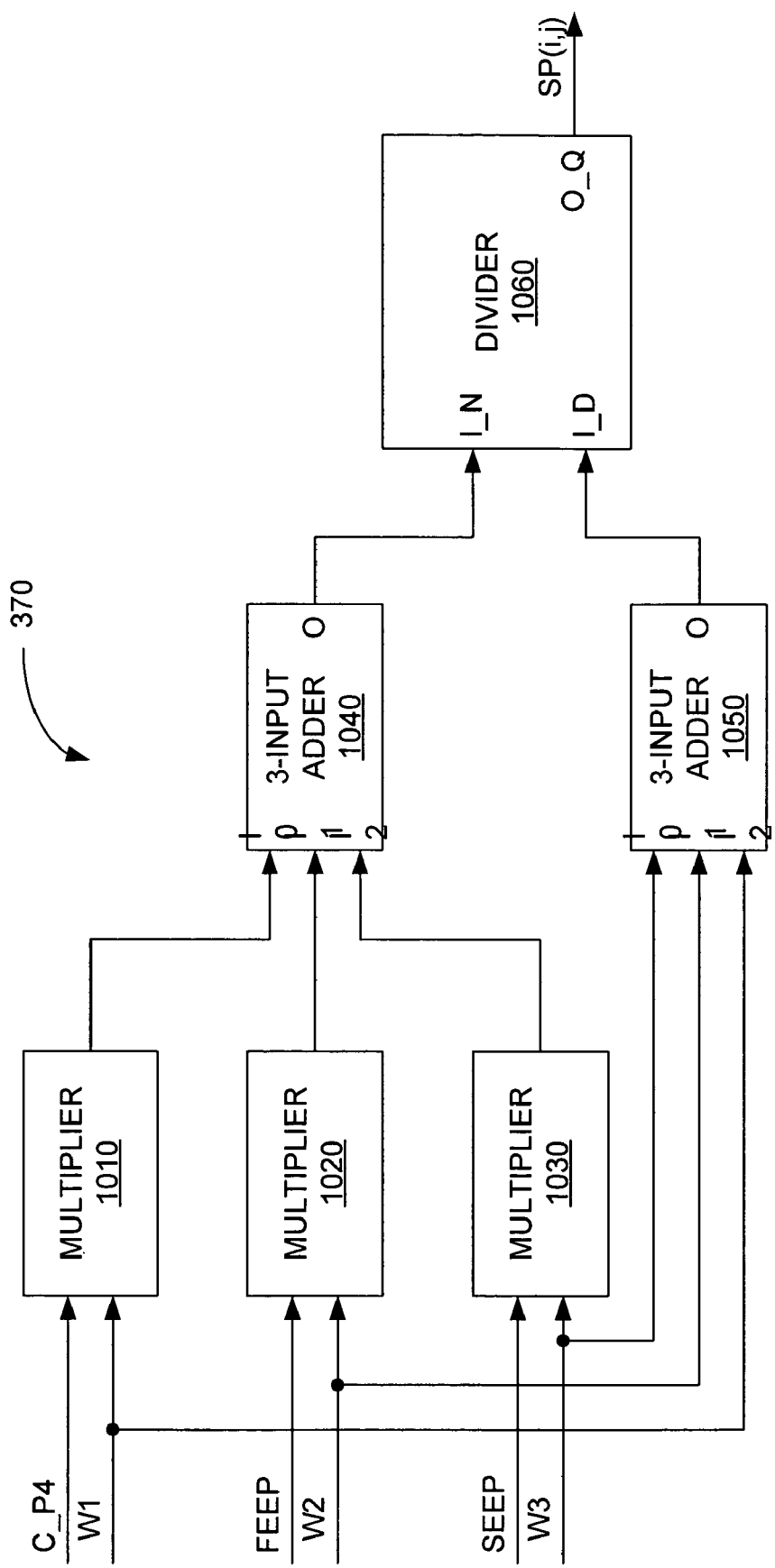
FIG. 10 is a block diagram of a smoothed pixel calculation unit in accordance with one embodiment of the present invention.

Smoothed pixel calculation unit 370 (FIG. 3) calculates smoothed pixel SP(i,j) based on first edge end pixel FEEP, second edge end pixel SEEP and consolidated pixel C_P 4. Specifically, smoother pixel SP(i,j) is equal to a normalized linear combination of consolidated pixel C_P4, first edge end pixel FEEP and second edge end pixel SEEP. Consolidated pixel C_P4, first edge end pixel FEEP and second edge end pixel SEEP can be assigned different weighting factors. FIG. 10 shows a block diagram of one embodiment of smoothed pixel calculation unit. The embodiment of FIG. 10 includes multipliers 1010, 1020 and 1030, 3-input adders 1040 and 1050, and a divider 1060. Multiplier 1010 calculates the product of consolidated pixel C_P4 and a weighting factor W1. Multiplier 1020 calculates the product of first edge end pixel FEEP with a weighting factor W2. Multiplier 1030 calculates a product of second edge end pixel SEEP and a weighting factor W3. 3-input adder 1040 has three input ports I0, I1, and I2, which receive the products from multipliers 1010, 1020, and 1030 respectively. 3-input adder 1040 adds the values from input ports I0, I1, and I2 and generates an output sum at output port O, which is coupled to a numerator input port I_N of divider 1060. Three input adder 1050 has three input ports I0, I1, and I2, which receive weighting factors W3, W2, and W1, respectively. 3-input adder 1050 adds the values from input ports I0, I1, and I2 and generates an output sum at output port O, which is coupled to a denominator input port I_D of divider 1060. Divider 1060 divides the value at numerator input port I_N by the value at denominator input port I_D to generate a quotient that is equal to smoothed pixel SP(i,j) at quotient output port O_Q. In some embodiment of the present invention the same weighting factor is assigned to consolidated pixel C_P4, first edge end pixel FEEP and second edge end pixel SEEP, so that the normalized linear combination reduces to the averaging operation, i.e., smoothed pixel SP(i,j) is equal to the sum of consolidated pixel C_P4, first edge end pixel FEEP and second edge end pixel SEEP divided by three (i.e., SP(i,j)=(C_P4+FEEP+SEEP)/3). In these embodiments multipliers 1010, 1020, and 1030 as well as 3-input adder 1050 would not be necessary. Consolidated pixel C_P4, first edge end pixel FEEP and second edge end pixel SEEP could be applied directly to input ports I0, I1, and I2, respectively, of 3-input adder 1040 and the number three could be applied to denominator input port I_D of divider 1060.

Subtle structure checking unit 380 receives smoothed pixel SP(i,j) and determines whether the smoothed pixel SP(i,j)

would smooth out subtle features of the frame and therefore should not be used to replace current pixel P(i,j). Subtle structure checking unit generates a subtle structure control signal SS that is used by output pixel selection unit 390 to choose between the current pixel P(i,j) and smoothed pixel SP(i,j). In one embodiment of the present invention, if smoothed pixel SP(i,j) is greater than the maximum value of the pixels diagonally adjacent to the current pixel, i.e. pixels P(i−1,j−1), P(i−1,j+1), P(i+1,j−1) and P(i+1,j+1) or if smoothed pixel SP(i,j) is less than the minimum value of pixels P(i−1,j−1), P(i−1,j+1), P(i+1,j−1) and P(i+1,j+1) (i.e. the diagonally adjacent pixels) or smoothed pixel SP(i,j) is greater than the maximum value of the pixels directly adjacent to the current pixel, i.e. P(i−1,j), P(i,j−1), P(i,j+1), and P(i+1,j) or smoothed pixel SP(i,j) is less than the minimum value of pixels P(i−1,j), P(i,j−1), P(i,j+1), and P(i+1,j) (i.e. the directly adjacent pixels) then current pixel P(i,j) should not be smoothed and subtle structure control signal SS is driven to a subtle logic state (typically logic low). Otherwise subtle structure control signal SS is driven to a not subtle logic state (typically logic high), which indicates that smoothed pixel SP(i,j) should be used.

Figure 12A:
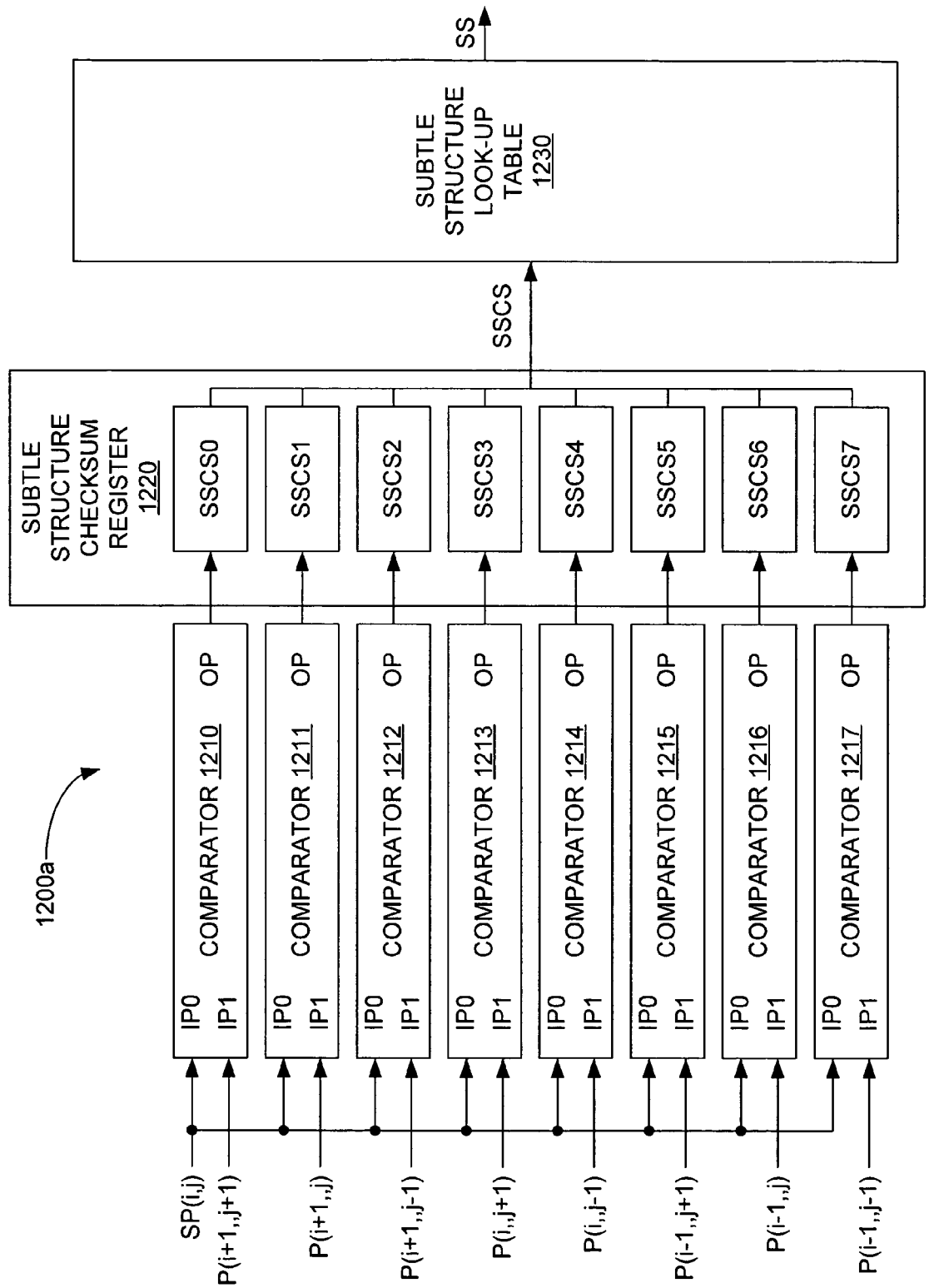
FIGS. 12(a) and 12(b) are block diagrams of subtle structure checking units in accordance with the present invention.

FIG. 12(a) is a block of a subtle structure checking unit 1200a in accordance with another embodiment of the present invention. The embodiment of FIG. 12(a), which includes comparators 1210-1217, subtle structure checksum register 1220, and subtle structure look-up table 1230, compares smoothed pixel SP(i,j) with a set of subtle structure pixels to determine whether to use pixel P(i,j) or smoothed pixel SP(i,j). In the embodiment of FIG. 12(a), the set of subtle structure pixels include the pixels surrounding current pixel P(i,j). Specifically, the pixel pattern of the subtle structure pixels which have a luminance value less than smoothed pixel SP(i,j) are compared to a predefined set of pixel patterns. If the pixel pattern of the subtle structure pixels, which have a luminance value less than smoothed pixel SP(i,j) matches a predefined pixel pattern, smoothed pixel SP(i,j) is selected, i.e. subtle structure control signal SS is driven to a not subtle logic state. Otherwise, pixel P(i,j) is selected, i.e. subtle structure control signal SS is driven to a subtle logic state. In general, the members of the predefined set of pixel patterns resemble edges.

Comparators 1210-1217 each have a first input port IP0, a second input port IP1 and an output port OP. Smoothed pixel SP(i,j) is applied to the first input port of IP0 of each comparator. Pixels P(i+1,j+1), P(i+1,j), P(i+1,j−1), P(i,j+1), P(i,j−1), P(i−1,j+1), P(i−1,j), and P(i−1,j−1) are applied to the second input port of comparators 1210, 1211, 1212, 1213, 1214, 1215, 1216 and 1217, respectively. The output port of comparators 1210, 1211, 1212, 1213, 1214, 1215, 1216, and 1217 are coupled to subtle structure checksum bits SSCS0, SSCS1, SSCS2, SSCS3, SSCS4, SSCS5, SSCS6 and SSCS7, respectively, of subtle structure checksum register 1220. Comparators 1210-1217 are configured to output a logic 1 when the value at first input port IP0 is greater than the value at second input port IP1 and to output a logic 0 otherwise. The subtle structure checksum bits forms an 8-bit number (i.e. the subtle structure checksum SSCS) in subtle structure checksum register 1220, with subtle structure checksum bit SSCS0 being the least significant bit and subtle structure checksum bit SSCS 7 being the most significant bit. In general, if subtle structure checksum is a member of a predefined set of check sum values then smoothed pixel SP(i,j) is selected; otherwise, pixel P(i,j) is selected. Each member of the predefined set of checksum values correspond to a member of the predefined set of pixel patterns.

Specifically, subtle structure checksum SSCS is used as an index to subtle structure look-up table 1230, which has 256 entries. The entries in subtle structure look-up table 1230 are binary values. For values of subtle structure checksum SSCS that are members of the predefined set of checksum values (i.e. corresponds to a member of the predefined set of pixel patterns), the binary value in subtle structure look-up table 1230 is equal to the not subtle logic state. For other values, the binary value in subtle structure look-up table 1230 is equal to the subtle logic state. The output of subtle structure look-up table 1230 provides subtle structure control signal SS.

Figure 13D:
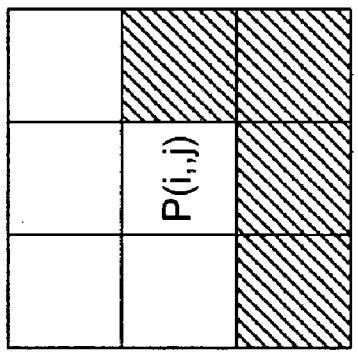
FIGS. 13(a)-13(p) illustrate pixel patterns in accordance with one embodiment of the present invention.
Figure 13H:
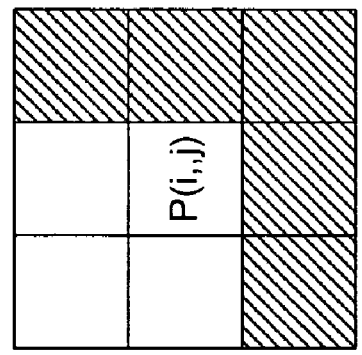
Figure 13C:
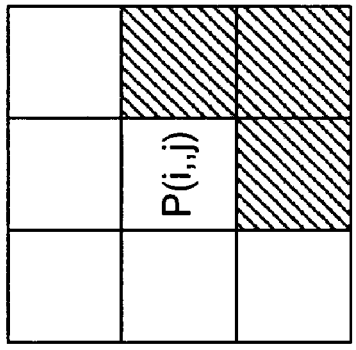
Figure 13G:
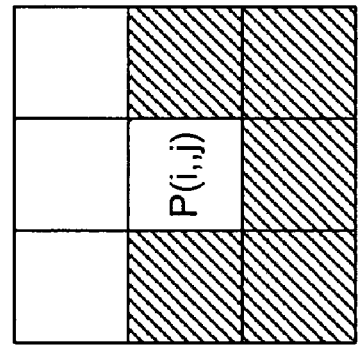
Figure 13B:
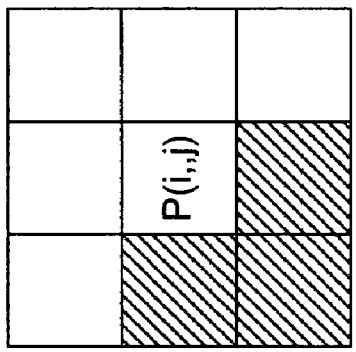
Figure 13F:
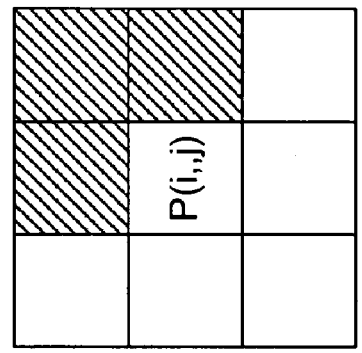
Figure 13A:
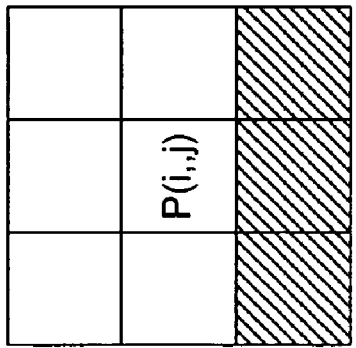

In one embodiment of the present invention the predefined set of checksum values includes 7, 11, 15, 22, 23, 31, 47, 104, 151, 208, 224, 232, 233, 240, 244, and 248. FIGS. 13(a)-13(p) shows the pixel patterns that correspond to subtle structure checksum SSCS of 7, 11, 15, 22, 23, 31, 47, 104, 151, 208, 224, 232, 233, 240, 244, and 248 respectively. FIGS. 13(a)-13(p) show the set of eight subtle structure pixels surrounding pixel P(i,j), shaded pixels are pixels that are less than smoothed pixel SP(i,j). As shown in FIG. 13(a), a subtle structure checksum of 7 corresponds to a pixel pattern in which bottom pixels are less than smoothed pixel SP(i,j). As shown in FIG. 13(b), a subtle structure checksum of 11 corresponds to a pixel pattern in which the three pixels of the bottom right corner are less than smoothed pixel SP(i,j). As shown in FIG. 13(c), a subtle structure checksum of 15 corresponds to a pixel pattern in which the three pixels of the bottom right corner and the bottom left pixel are less than smoothed pixel SP(i,j). As shown in FIG. 13(d), a subtle structure checksum of 22 corresponds to a pixel pattern in which the three pixels of the bottom left corner are less than smoothed pixel SP(i,j).

Figure 13E:
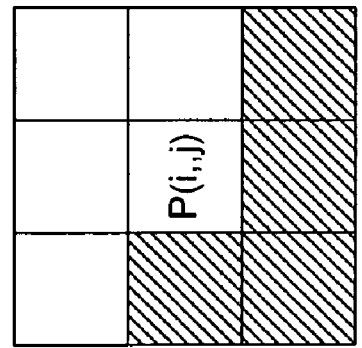

As shown in FIG. 13(e), a subtle structure checksum of 23 corresponds to a pixel pattern in which the three pixels of the bottom left corner and the bottom right pixel are less than smoothed pixel SP(i,j). As shown in FIG. 13(f), a subtle structure checksum of 31 corresponds to a pixel pattern in which the three bottom pixels, the left pixel and the right pixel are less than smoothed pixel SP(i,j). As shown in FIG. 13(g), a subtle structure checksum of 47 corresponds to a pixel pattern in which the bottom row and right column pixels are less than smoothed pixel SP(i,j). As shown in FIG. 13(h), a subtle structure checksum of 104 corresponds to a pixel pattern in which the three pixels of the top right corner are less than smoothed pixel SP(i,j).

Figure 13I:
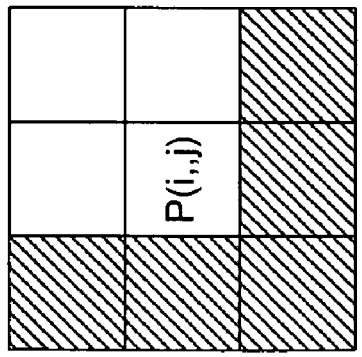
Figure 13J:
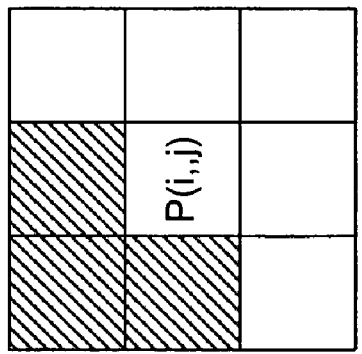
Figure 13K:
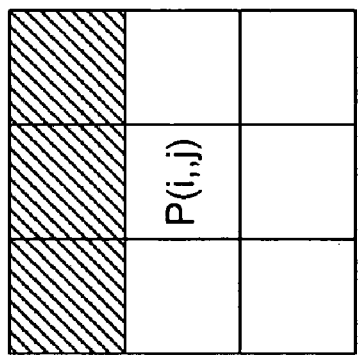
Figure 13L:
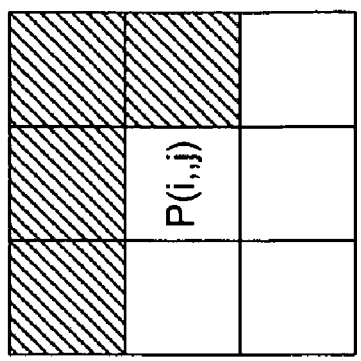

As shown in FIG. 13(i), a subtle structure checksum of 151 corresponds to a pixel pattern in which the left column and bottom row pixels are less than smoothed pixel SP(i,j). As shown in FIG. 13(j), a subtle structure checksum of 208 corresponds to a pixel pattern in which the three pixels of the top left corner are less than smoothed pixel SP(i,j). As shown in FIG. 13(k), a subtle structure checksum of 224 corresponds to a pixel pattern in which the three pixels of the top row are less than smoothed pixel SP(i,j). As shown in FIG. 13(l), a subtle structure checksum of 232 corresponds to a pixel pattern in which the three pixels of the top right corner and the top left pixel are less than smoothed pixel SP(i,j).

Figure 13M:
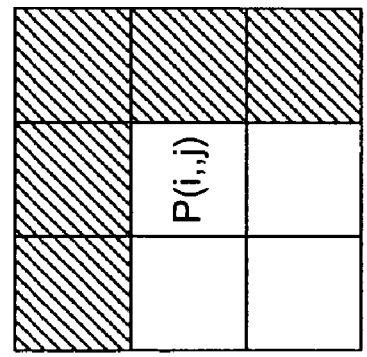
Figure 13N:
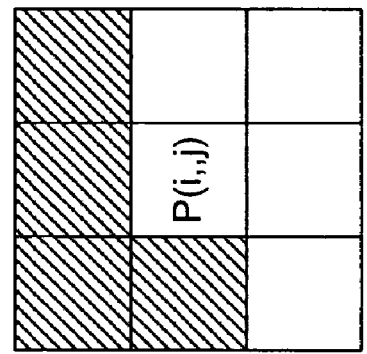
Figure 13O:
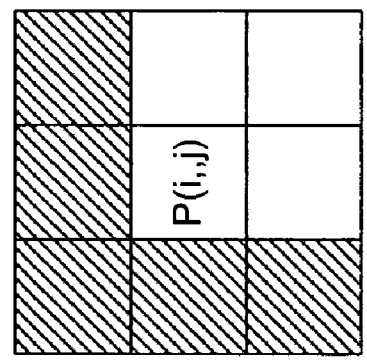
Figure 13P:
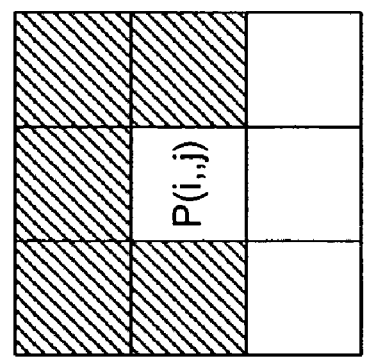

As shown in FIG. 13(m), a subtle structure checksum of 233 corresponds to a pixel pattern in which the pixels of the top row and right column are less than smoothed pixel SP(i,j). As shown in FIG. 13(n), a subtle structure checksum of 240 corresponds to a pixel pattern in which the three pixels of the top left corner and the top right pixel are less than smoothed pixel SP(i,j). As shown in FIG. 13(o), a subtle structure checksum of 244 corresponds to a pixel pattern in which the pixels of the top row and left column are less than smoothed pixel SP(i,j). As shown in FIG. 13(p), a subtle structure checksum of 248 corresponds to a pixel pattern in which the pixels of the top row, the left pixel, and the right pixel are less than smoothed pixel SP(i,j). Other embodiments of the present invention may not use all of the pixel patterns shown in FIGS. 13(a)-13(p). In addition some embodiments of the present invention may use other pixel patterns in place of or in addition to the pixel patterns shown in FIG. 13(a)-13(p). Furthermore, some embodiments of the present invention could use different predetermined patterns and different sets of subtle pixels that may be larger or smaller than the eight pixels used in the embodiment of FIG. 12(a).

Figure 12B:
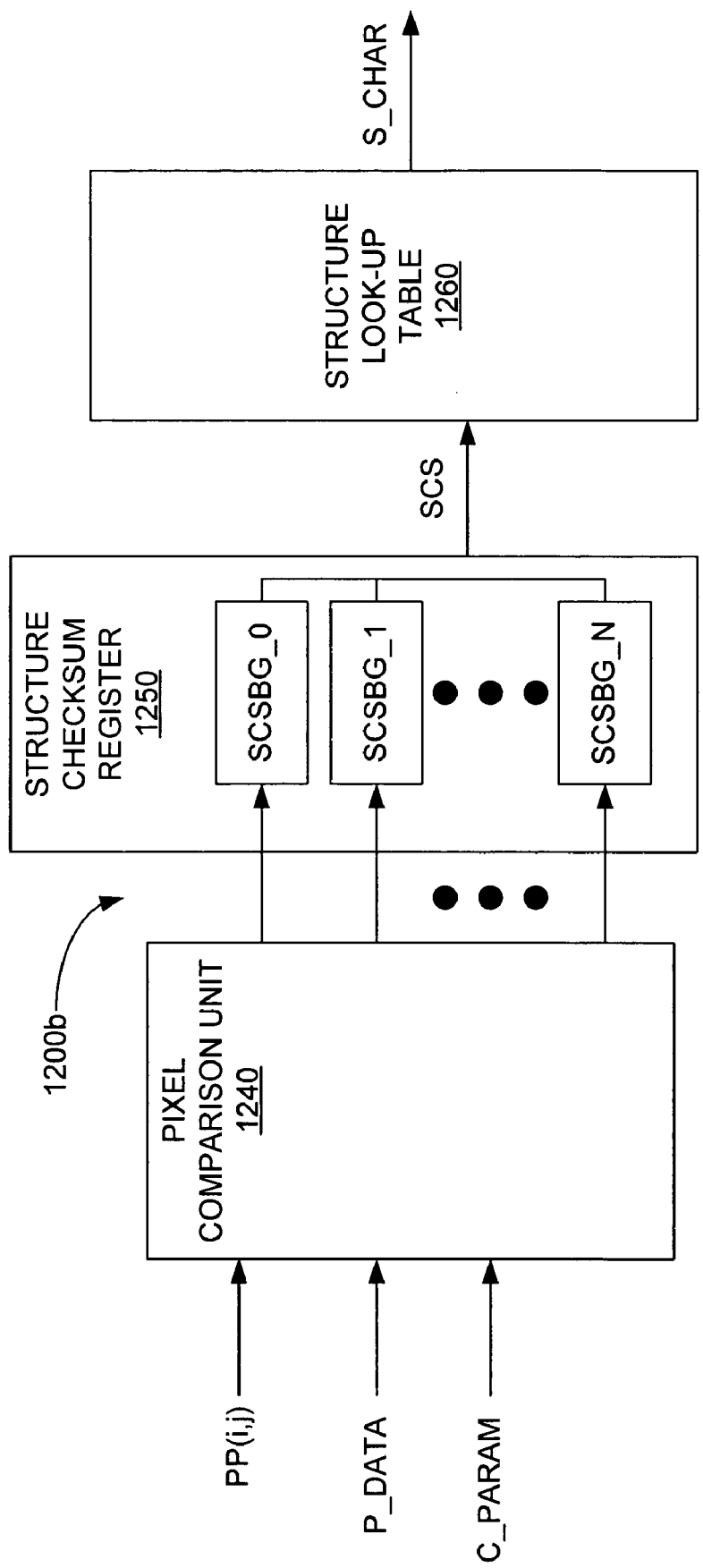

Subtle structure checking unit 1200a is a specific embodiment of a more general structure characterization unit 1200b (illustrated in FIG. 12(b)). Specifically, subtle structure checking unit 1200a is tailored for use with image smoother 300. However, the principles of structure characterization unit 1200b (FIG. 12(b)) can be used to characterize structures for any type of image processing; although usually structure characterization is used when a processed pixel (such as smoothed pixel SP(i,j)) is generated to possibly replace a current pixel. Structure checking unit 1200b includes a pixel comparison unit 1240, a structure checksum register 1250, and a structure look-up table 1260. Pixel comparison unit 1240, which receives a processed pixel PP(i,j), pixel data P_DATA for a group of pixels near the current pixel, and comparison parameters C_PARAM, generates structure checksum bit groups SCSBG_O, SCSBG_1, ... SCSBG_N, which are stored in structure checksum register 1250. Structure checksum bit groups SCSBG_O, SCSBG_1, ..., SCSBG_N form structured checksum SCS, which is used to index structure look-up table 1260. Structure look-up table 1260 outputs a structure characteristic S_CHAR, which describes the structure of the pixels. In many embodiments of the present invention structure checksum register 1250 is incorporated within pixel comparison unit 1240. In some embodiments of the present invention, structure checksum register 1250 is omitted.

The specific implementation of pixel comparison unit 1240 varies depending on the type of image processing being performed. For example in subtle structure checking unit 1200a (FIG. 12(a)), pixel comparison unit compares smoothed pixel SP(i,j), which is equivalent to the processed pixel, with pixel data P_DATA of each pixel surrounding the current pixel to generate a single bit (i.e. the structured checksum bit groups are of size 1 bit). Furthermore, no comparison parameters are used. However other embodiments of the pixel comparison unit 1240 may perform more elaborate comparisons. For example, in one embodiment of the present invention, pixel comparison unit 1240 generates structure checksum bit group SCSBG_X to indicate whether the processed pixel is greater than a pixel P_X by a threshold provided in comparison parameters C_PARAM. In another embodiment of the present invention, pixel comparison unit 1240 generates a 2-bit checksum bit group SCSBG_X to indicate whether processed pixel PP(i,j) is less than (i.e. SCSBG_X=00), greater than (i.e., SCSBG_X=11), or within (i.e., SCSBG_X=10) a range defined by pixel P_X and pixel P_X+1.

Structure checksum register 1250 is used to store the structure checksum bit groups and to provide structure checksum SCS as the index to structure look-up table 1260. Structure look-up table 1260 contains structure characteristics corresponding to the possible values of structure checksum SCS. The specific structure characteristics depends on the image processing being performed. For example, for subtle structure checking unit 1200a, the structure characteristic is a single bit indicating whether subtle structures were detected for the corresponding index values. Other embodiments may encode more information in a multi-bit structure characteristic. For example, in one embodiment of the present invention, the structure characteristics stored in structure look-up table 1260 correspond to edge directions of a dominant edge. Specifically, horizontal edge direction is encoded as a two bit value 00, vertical edge direction is encoded as a two bit value 01, 45 degree edge direction is encoded as a two bit value 10, and 135 degree edge direction is encoded as a two bit value 11.

Figure 11:
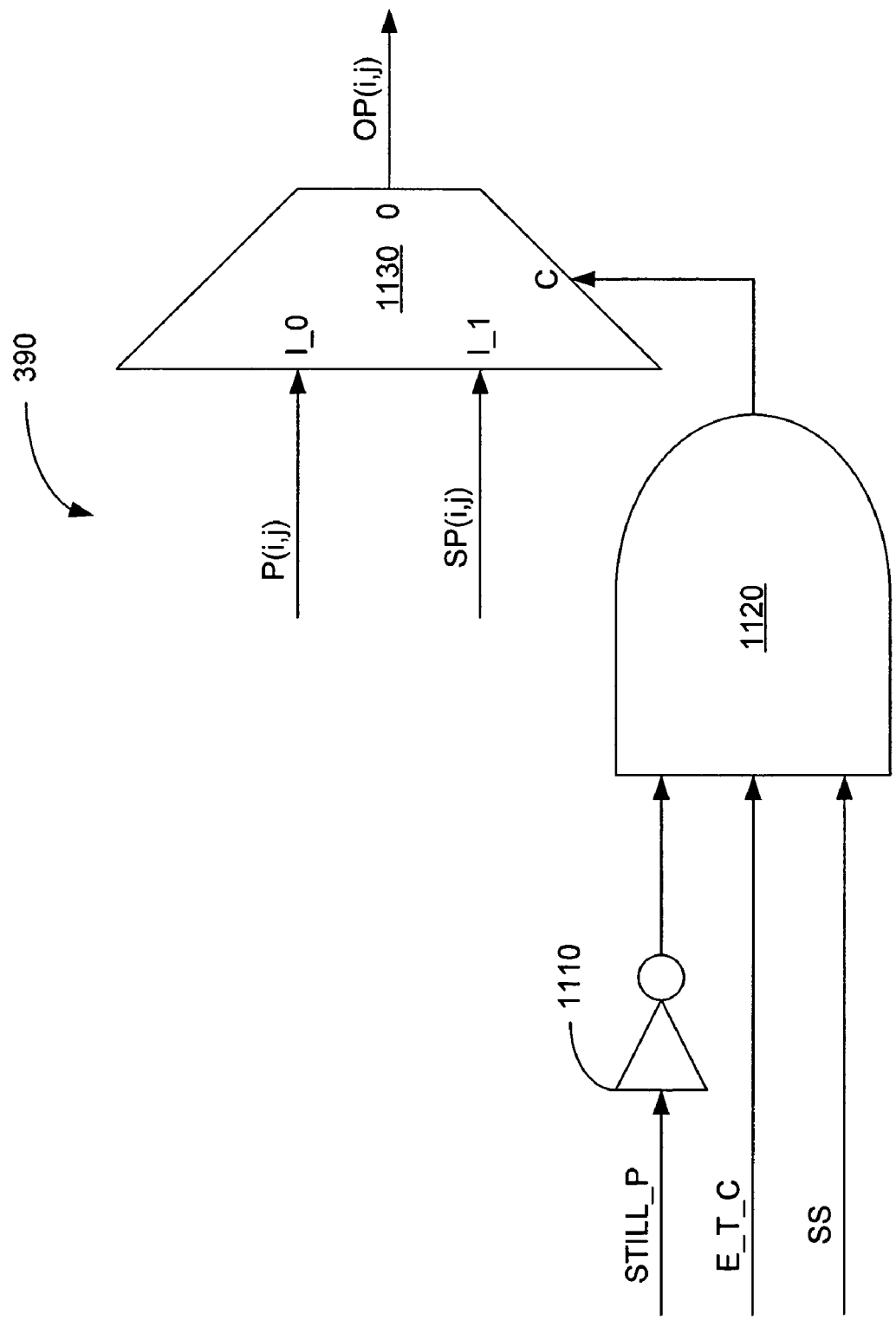
FIG. 11 is a block diagram of an output pixel selection unit in accordance with one embodiment of the present invention.

Output pixel selection unit 390 selects either current pixel P(i,j) or smoothed pixel SP(i,j) as an output pixel OP(i,j). Specifically, if still pixel control signal STILL_P is at logic low, which indicates that the current pixel is a moving pixel, edge threshold control signal E_T_C is at a threshold met logic state (typically logic high), and subtle structure control signal SS is at a not subtle logic state (typically logic high), then output pixel OP(i,j) is set equal to smoothed pixel SP(i,j). Otherwise, output pixel OP(i,j) is set equal to current pixel P(i,j). FIG. 11 is a block diagram of one embodiment of output pixel selection unit 390. The embodiment of FIG. 11 includes an inverter 1110, a three input AND gate 1120, and a multiplexing circuit 1130. Still pixel control signal STILL_P is coupled to the input port of inverter 1110, which has an output port coupled to a first input terminal of 3-input AND gate 1120. Edge threshold control signal E_T_C and subtle structure control signal SS are coupled to the second and third input terminals of 3-input AND gate 1120. The output terminal of 3-input AND gate 1120 is couple to a control terminal C of multiplexing circuit 1130. Smoothed pixel SP(i,j) is applied to logic high input port I_1 of multiplexing circuit 1130 and current pixel P(i,j) is applied to logic low input port I_0 of multiplexing circuit 1130. Output port O of multiplexing circuit 1130 provides output pixel OP(i,j).

In the various embodiments of the present invention, novel structures have been described for smoothing a frame to remove jagged edges. The various embodiments of the structures and methods of this invention that are described above are illustrative only of the principles of this invention and are not intended to limit the scope of the invention to the particular embodiments described. For example, in view of this disclosure those skilled in the art can define other smoothing filters, pixel consolidation units, consolidation sizes, still pixel detection units, edge detection units, smoothed pixel calculation units, subtle structure checking units, pixel patterns, edge threshold checking units, output pixel selection units, and use these alternative features to create a method, circuit, or system according to the principles of this invention. Thus, the invention is limited only by the following claims.

What is claimed is:

1. A method of calculating an output pixel by characterizing structures in a plurality of pixels; the method comprising:
   generating a smoothed pixel using a current pixel and the plurality of pixels;
   generating a plurality of structure checksum bit groups by comparing a pixel value of each pixel in the plurality of pixels with the smoothed pixel;
   combining the structure checksum bit groups to form the structure checksum;
   indexing a table of structure characteristics with the structure checksum to select a structure characteristic corresponding to the structure checksum; and
   setting the output pixel equal to the current pixel when the structure characteristic is a first value; and
   setting the output pixel equal to the smoothed pixel when the structure characteristic is a second value, wherein the second value is different from the first value.

2. The method of claim 1, further comprising:
setting a checksum bit group corresponding to each pixel to indicate when the pixel value is greater than the smoothed pixel.

3. The method of claim 2, wherein the generating a plurality of structure checksum bit groups further comprises setting the checksum bit group corresponding to each pixel to indicate when the pixel value is less than or equal to the smoothed pixel.

4. The method of claim 2, wherein the plurality of pixels surround a current pixel.

5. The method of claim 1, wherein each structure checksum bit group is a single bit.

6. The method of claim 1, further comprising:
defining a predefined set of checksum values, wherein each member of the predefined set of checksum values correspond to a member of a predefined set of structures; and
loading the table of structure characteristics at each index value corresponding to a member of the set of checksum values with a first characteristic value.

7. The method of claim 6, further comprising loading the table of structure characteristics at each index value not corresponding to a member of the set of checksum values with a second characteristic value.

8. A system for calculating an output pixel by characterizing structures in a plurality of pixels; the system comprising:
means for generating a smoothed pixel using a current pixel and the plurality of pixels;
means for generating a plurality of structure checksum bit groups using means for comparing a pixel value of each pixel in the plurality of pixels with the smoothed pixel;
means for combining the structure checksum bit groups to form the structure checksum;
means for indexing a table of structure characteristics with the structure checksum to select a structure characteristic corresponding to the structure checksum; and
means for setting the output pixel equal to the current pixel when the structure characteristic is a first value; and
means for setting the output pixel equal to the smoothed pixel when the structure characteristic is a second value, wherein the second value is different from the first value.

9. The system of claim 8, further comprising:
means for setting a checksum bit group corresponding to each pixel to indicate when the pixel value is greater than the smoothed pixel.

10. The system of claim 9, wherein the means for generating a plurality of structure checksum bit groups further comprises means for setting the checksum bit group corresponding to each pixel to indicate when the pixel value is less than or equal to the smoothed pixel.

11. The system of claim 9, wherein the plurality of pixels surround a current pixel.

12. The system of claim 8, wherein each structure checksum bit group is a single bit.

13. The system of claim 8, further comprising:
means for defining a predefined set of checksum values, wherein each member of the predefined set of checksum values correspond to a member of a predefined set of structures; and
means for loading the table of structure characteristics at each index value corresponding to a member of the set of checksum values with a first characteristic value.

14. The system of claim 13, further comprising means for loading the table of structure characteristics at each index value not corresponding to a member of the set of checksum values with a second characteristic value.

15. An image smoother with a structure characteristic unit for providing a structure characteristic of a plurality of pixels comprising:
a smoothed pixel calculation unit to calculate a smoothed pixel from a current pixel and the plurality of pixels;
a pixel comparison unit configured to generate a plurality of structure checksum bit groups by comparing the smoothed pixel with pixel data about the plurality of pixels, wherein the structure checksum bit groups form a structure checksum; and
a structure lookup table indexed by the structure checksum from the pixel comparison unit to provide the structure characteristic; and
an output pixel selection unit configured to set an output pixel equal to the smoothed pixel when the structure characteristic is a first value and to set the output pixel equal to the current pixel when the structure characteristic is a second value, wherein the second value is different from the first value.

16. The image smoother of claim 15, further comprising a structure checksum register coupled to receive the structure checksum bit groups from the pixel comparison unit and to provide the structure checksum to the structure look-up table.

17. The image smoother of claim 15, wherein each structure checksum bit group has a size of one bit.

18. The image smoother of claim 15, wherein the pixel comparison unit further comprises a plurality of comparators, each having a first input port coupled to receive a smoothed pixel value, a second input port coupled to receive pixel data from a pixel of the plurality of pixels, and an output port providing a structure checksum bit group.

19. The image smoother of claim 15, wherein the pixel comparison unit is configured to receive one or more comparison parameters.

20. The image smoother of claim 15, wherein the structure look-up table is configured to have a first characteristic value at each index value corresponding to a member of a set of checksum values.

21. The image smoother of claim 20, wherein the structure look-up table is configured to have a second characteristic value at each index value not corresponding to a member of a the set of checksum values.

* * * * *